United States Patent
Mehring

(10) Patent No.: US 10,618,636 B2
(45) Date of Patent: Apr. 14, 2020

(54) HEAT EXCHANGER FOR LAMINAR-FLOW AIRCRAFT

(71) Applicant: Parker-Hannifin Corporation, Cleveland, OH (US)

(72) Inventor: Carsten Ralf Mehring, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 631 days.

(21) Appl. No.: 15/107,970

(22) PCT Filed: Mar. 4, 2015

(86) PCT No.: PCT/US2015/018773
§ 371 (c)(1),
(2) Date: Jun. 24, 2016

(87) PCT Pub. No.: WO2015/183360
PCT Pub. Date: Dec. 3, 2015

(65) Prior Publication Data
US 2016/0332724 A1 Nov. 17, 2016

Related U.S. Application Data

(60) Provisional application No. 61/947,619, filed on Mar. 4, 2014.

(51) Int. Cl.
*B64D 13/08* (2006.01)
*B64C 21/06* (2006.01)
(Continued)

(52) U.S. Cl.
CPC ............ *B64C 21/06* (2013.01); *B64D 13/006* (2013.01); *B64D 13/08* (2013.01); *B64D 15/04* (2013.01);
(Continued)

(58) Field of Classification Search
CPC ...... B64D 13/006; B64D 13/08; B64D 33/10; B64D 2013/0622; B64C 2230/22; F28F 13/003
See application file for complete search history.

(56) References Cited

U.S. PATENT DOCUMENTS 3,677,293 A * 7/1972 Furlong ................. B64D 13/04
137/561 R
3,981,466 A 9/1976 Shah
(Continued)

FOREIGN PATENT DOCUMENTS

| EP | 0459816 A1 | 12/1991 |
|---|---|---|
| JP | 03025096 | 1/1991 |
| WO | 2014134040 A1 | 9/2014 |

OTHER PUBLICATIONS

International Search Report for corresponding patent application No. PCT/US2015/018773 dated Nov. 24, 2015.
(Continued)

*Primary Examiner* — Brian M O'Hara
*Assistant Examiner* — Keith L Dixon
(74) *Attorney, Agent, or Firm* — Renner, Otto, Boisselle & Sklar, LLP

(57) ABSTRACT

A laminar flow control surface having a foraminous section (also referred to below as a foraminous portion, 251) of a skin (250) of a vehicle to permit low temperature fluid to flow through the foraminous section to a heat exchanger (236), to reduce drag of the vehicle and to dissipate heat from the heat exchanger. The foraminous section (251) and the heat exchanger (236) synergistically reduce drag and transfer heat from the heat exchanger. The vehicle may be an aircraft with a laminar flow control system including a foraminous portion on a leading edge of the aircraft. While the aircraft is in flight, a portion of air impinging near the foraminous portion may flow laminarly about the leading
(Continued)

edge, and another portion of the impinging air may flow through the foraminous portion to a heat exchanger to transfer heat from the heat exchanger to the air.

20 Claims, 12 Drawing Sheets

(51) Int. Cl.
*F28F 13/00* (2006.01)
*B64D 13/00* (2006.01)
*B64D 15/04* (2006.01)
*B64D 33/10* (2006.01)
B64D 13/06 (2006.01)
F28D 21/00 (2006.01)

(52) U.S. Cl.
CPC ............ *B64D 33/10* (2013.01); *F28F 13/003* (2013.01); *B64C 2230/22* (2013.01); *B64D 2013/0622* (2013.01); *F28D 2021/0021* (2013.01); *Y02T 50/166* (2013.01); *Y02T 50/56* (2013.01)

(56) References Cited

U.S. PATENT DOCUMENTS

| | | |
|---|---|---|
| 4,482,114 A | 11/1984 | Gupta et al. |
| 4,749,150 A | 6/1988 | Rose et al. |
| 4,819,720 A | 4/1989 | Howard |
| 5,114,100 A | 5/1992 | Rudolph et al. |
| 5,137,230 A | 8/1992 | Coffinberry |
| 5,297,765 A | 3/1994 | Hughes et al. |
| 5,944,287 A | 8/1999 | Rodgers |
| 7,866,609 B2 | 1/2011 | Parikh |
| 2009/0014593 A1 | 1/2009 | Westenberger et al. |
| 2011/0186263 A1 | 8/2011 | Piesker |

OTHER PUBLICATIONS

D. Arnal and J.P. Archambaud, Laminar-Turbulent Transition Control: NLF, LFC, HLFC, published in 2008, 1-22 pages.
Marty Bradley et al., NASA N+3 Subsonic Ultra Green Aircraft Research SUGAR Final Review, Apr. 20, 2010, Boeing Research & Technology, 1-297 pages.
Albert L. Braslow, A History of Suction-Type Laminar-Flow Control with Emphasis on Flight Research, NASA History Division, Office of Policy and Plans, NASA Headquarters, Washington, DC 20546, Monographs in Aerospace History, No. 13, 1999.

* cited by examiner

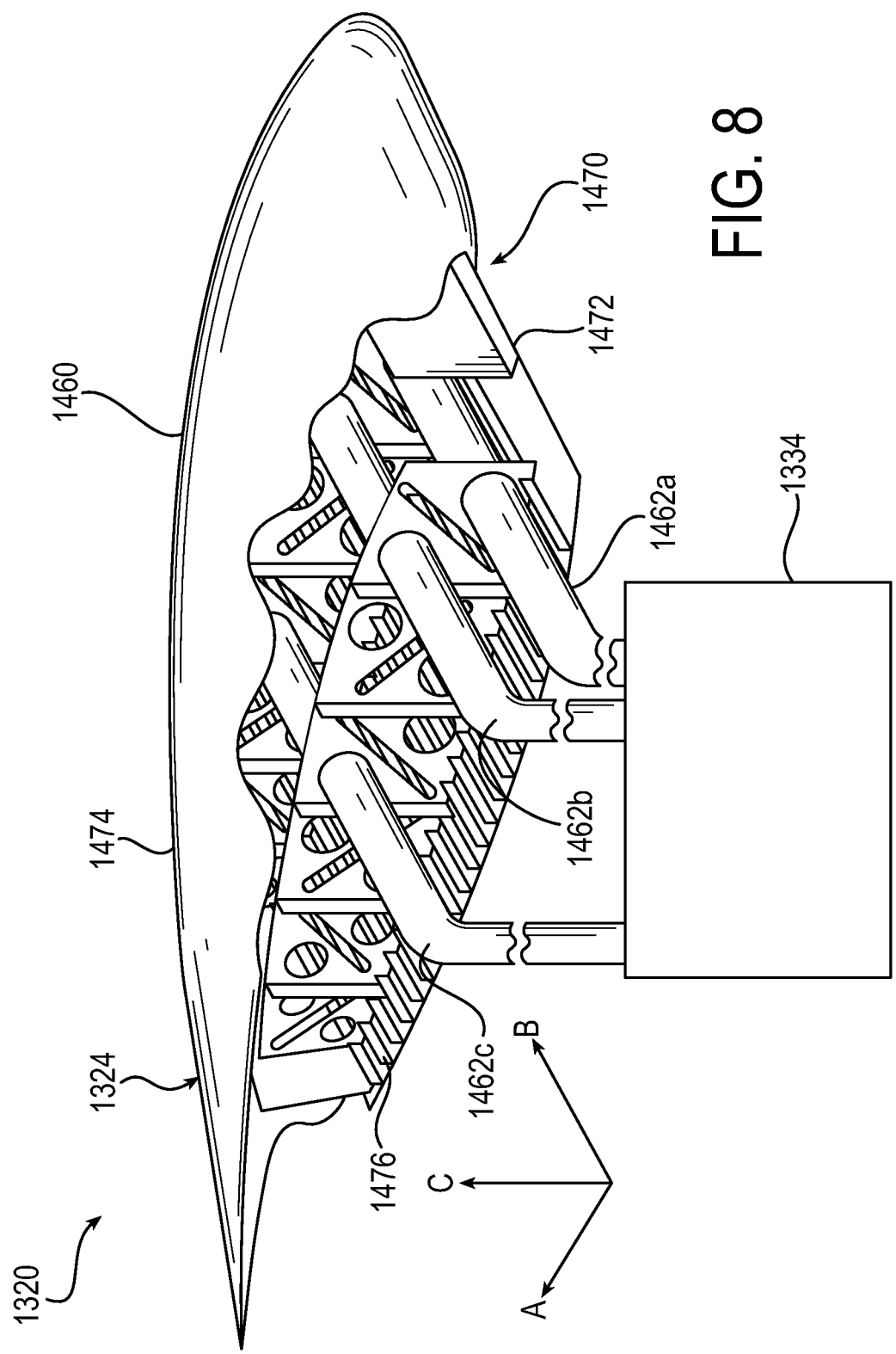

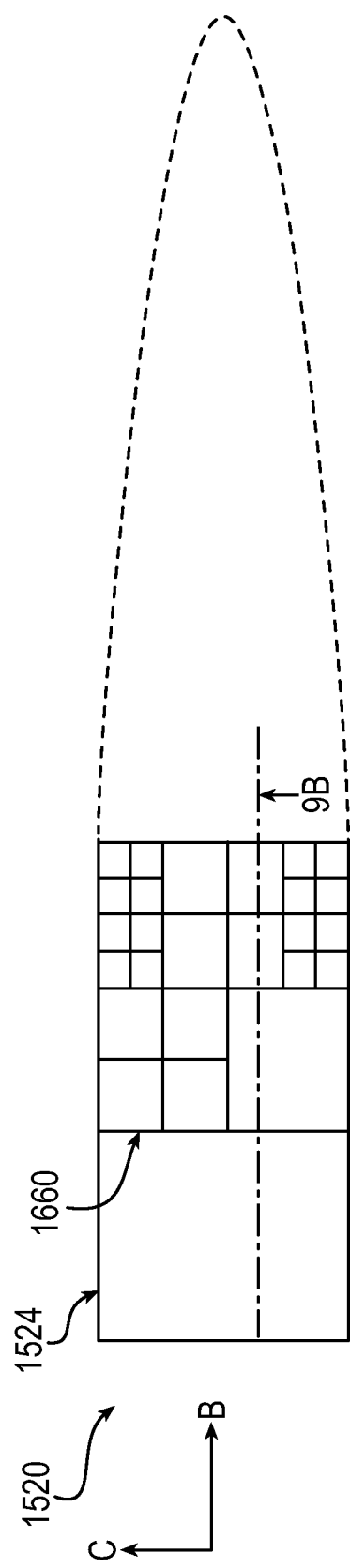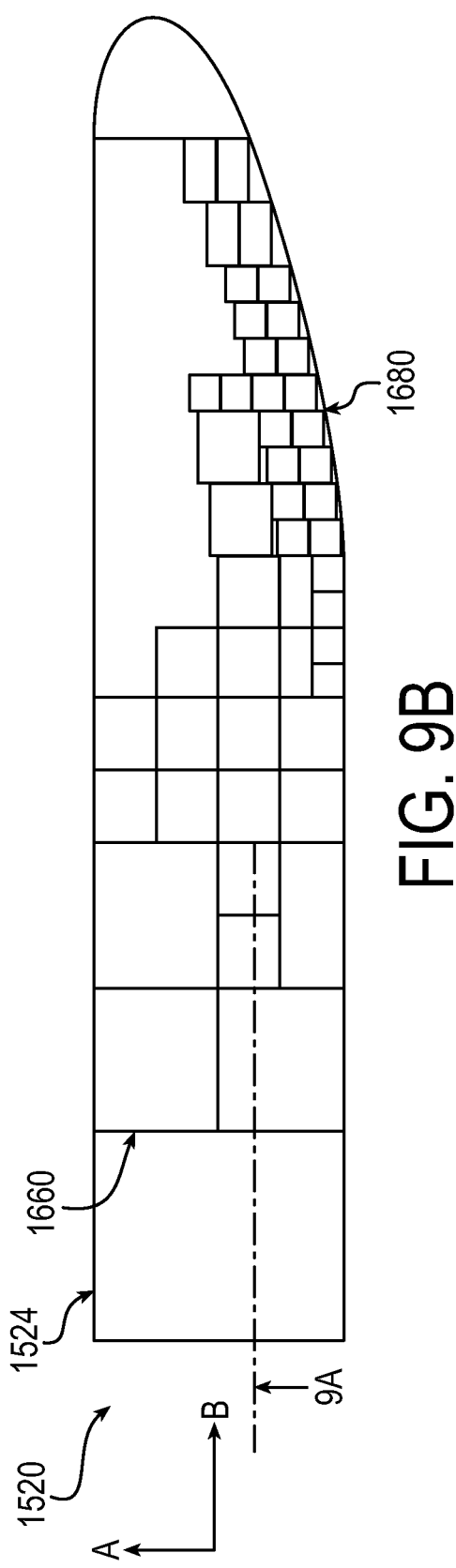

HEAT EXCHANGER FOR LAMINAR-FLOW AIRCRAFT

RELATED APPLICATIONS

This application is a national phase of International Application No. PCT/US2015/018773 filed Mar. 4, 2015 and published in the English language, which claims the benefit of U.S. Provisional Application No. 61/947,619 filed Mar. 4, 2014, which is incorporated herein by reference.

TECHNICAL FIELD

The present disclosure relates generally to vehicle heat exchangers, and more particularly to heat exchangers for aircraft.

BACKGROUND

Aircraft designers and manufacturers are under continual pressure to reduce the aerodynamic drag on aircraft surfaces, so as to increase aircraft performance and/or to reduce aircraft fuel consumption. Aircraft are generally designed with gentle curves and smooth surfaces to enable laminar air flow over extended surface areas in order to decrease drag, thereby increasing overall fuel efficiency of the aircraft while in flight.

A significant amount of aircraft drag is caused by boundary layers that build up on the exposed surfaces of the aircraft during flight. A boundary layer is a thin layer of low velocity, low dynamic pressure air located near a solid boundary and resulting from the air being at rest at the interface with the solid boundary. The boundary layer build-up on the aircraft wings and/or other external surfaces causes skin friction and therefore significantly contributes to airplane drag. Because laminar boundary layers create less friction at the aircraft surfaces than do turbulent boundary layers, one technique for reducing aircraft drag is to establish and to preserve a laminar boundary layer over a significant portion of the external surfaces of the aircraft.

On some aircraft, porous or perforated outer layers have been used on surfaces and leading edges of wings, vertical/horizontal, stabilizers and engine nacelles to enhance laminar flow over a corresponding portion of the external surface of the aircraft. This method preserves the laminar boundary layer by removing a small amount of the low momentum boundary layer air through the exposed flow surface via a distributed suction system.

Aircraft also contain internal heat generating components and systems, such as power electronics, multifunction fuel cell power Systems ("MFFCS"), auxiliary power units ("APUs") and main engines. Typically, aircraft dissipate excess heat to the atmosphere through heat exchangers. These heat exchangers tend to be heavy, which reduces available transport capacity of the aircraft, especially if the temperature differential between the hot and cold working media of the heat exchanger is small.

SUMMARY

The present disclosure provides a laminar flow control surface having a foraminous section (also referred to below as a foraminous portion, e.g., a perforated portion or a porous portion) of a skin of a vehicle to permit low temperature fluid to flow through the foraminous section to a heat exchanger, to reduce drag of the vehicle and to dissipate heat from the heat exchanger. The foraminous section and the heat exchanger synergistically reduce drag and transfer heat from the heat exchanger. For example, the vehicle may be an aircraft with a laminar flow control system including a foraminous portion on a leading edge of the aircraft, such as a leading edge of a wing. While the aircraft is in flight, a portion of air impinging near the foraminous portion may flow laminarly about the leading edge, and another portion of the impinging air may flow through the foraminous portion to a heat exchanger to transfer heat from the heat exchanger to the air. In an embodiment, the heat exchanger receives heat from a heat source, such as an MFFCS An aspect of the disclosure relates to a suction-type laminar flow control surface whereby the suction flow decreases aircraft drag and serves as cold-side heat transfer medium for a multifunctional wing-integrated heat exchanger (providing in its construction structural wing support as well as de-icing function by means of its hot-side fluid as mentioned above) or other traditional aircraft heat exchanger located elsewhere on the aircraft. According to an embodiment, a de-icing conduit provides heat to a corresponding foraminous portion. The de-icing conduit may be integrated into a heat exchanger to reduce system complexity.

A further aspect of the disclosure relates to a structural support forming a thermally conductive portion of a heat exchanger. The structural support may be integrated into a heat exchanger to reduce system complexity, weight, and assembly time.

As used herein, the term connect includes the term couple.

According to an aspect of the invention, a heat exchange system for a vehicle, comprising a vehicle panel for forming an outer surface of the vehicle, a laminar flow control surface forming at least a portion of an exterior surface of the vehicle panel, at least a portion of the laminar flow control surface being foraminous to permit a first portion of an external fluid to flow therethrough and to enhance laminar flow characteristics of a second portion of the external fluid that flows over the exterior surface of the vehicle panel, and a heat exchanger in fluid communication with the foraminous portion to receive the first portion of the external fluid that flows interiorly through the foraminous portion and to provide heat transfer from the heat exchanger to the first portion of the external fluid.

The foregoing and other features of the disclosure are hereinafter described in greater detail with reference to the accompanying drawings.

BRIEF DESCRIPTION OF THE DRAWINGS

FIG. 8 is a perspective view of an aircraft wing having an exemplary structural support forming a portion of an exemplary heat exchanger thermally connected to a heat source.

FIG. 9A is a schematic side view of an aircraft wing having exemplary structural supports of varying densities.

FIG. 9B is a schematic top view of the aircraft wing of FIG. 9A.

DETAILED DESCRIPTION

The principles of this present disclosure have particular application to heat exchangers for transferring heat to air impinging a foraminous portion of an aircraft skin, such as a foraminous portion of a leading edge of a tail of the aircraft, and thus will be described below chiefly in this context. It will be appreciated that principles of this disclosure may be applicable to other vehicles where it is desirable to reduce a drag coefficient of the vehicle and to transfer heat from a heat source.

Figure 1A:
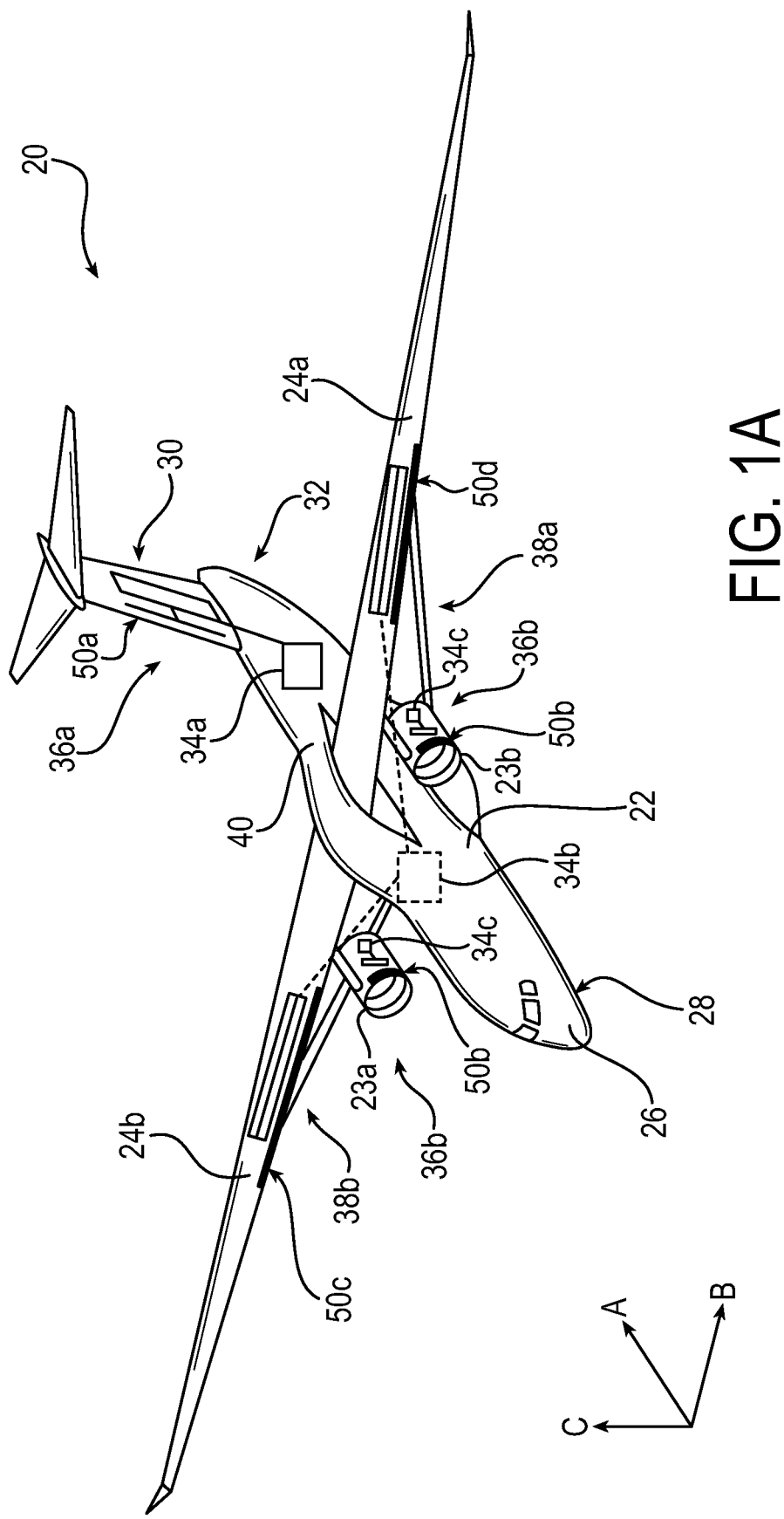
FIG. 1A is a perspective view of a vehicle having a foraminous portion of skin with exemplary heat exchangers thermally connected to heat sources.
Figure 1B:
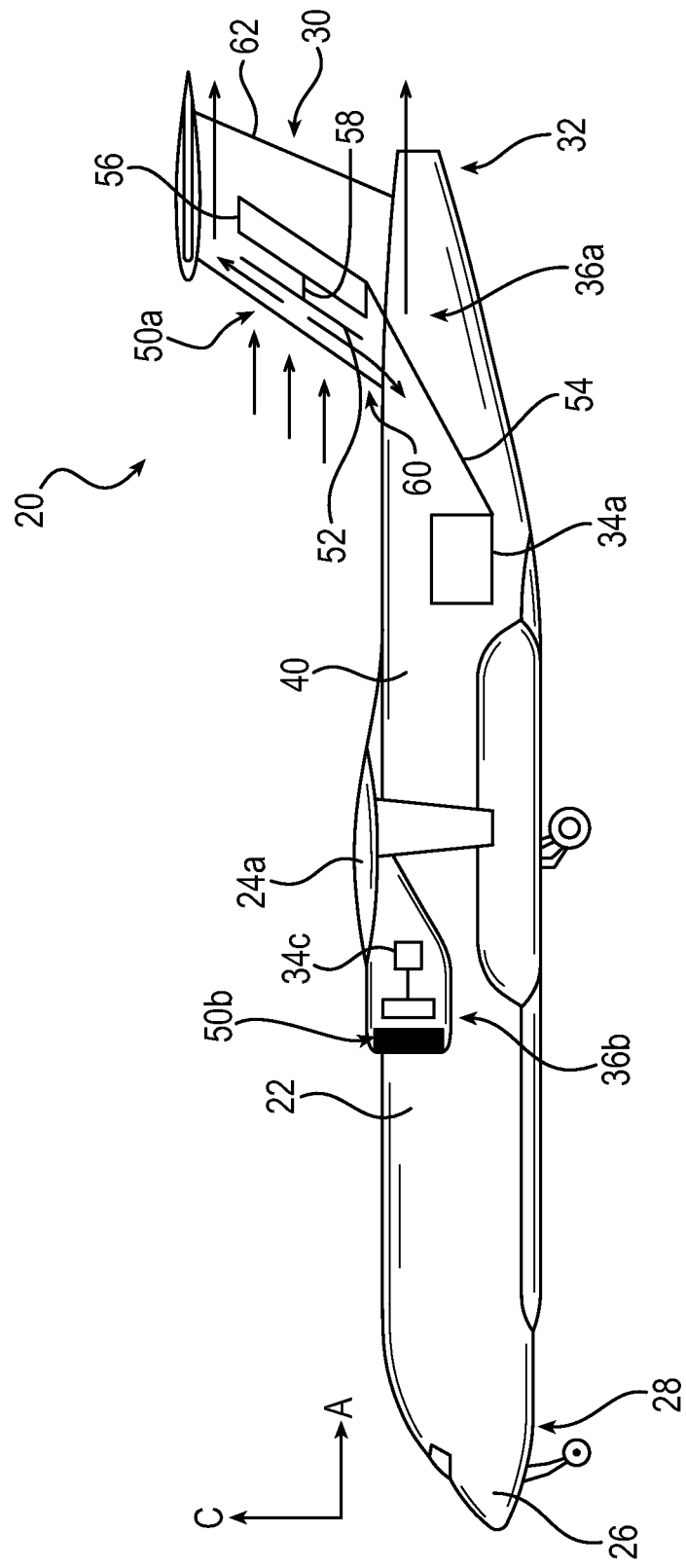
FIG. 1B is a side view of the vehicle of FIG. 1A and one of the heat exchangers thermally connected to one of the heat sources.

Referring now in detail to the drawings, and initially to FIGS. 1A and 1B, a vehicle, in this instance by way of example, an aircraft 20, is illustrated. The aircraft 20 may be of any type, such as a commercial airliner. The aircraft 20 may include a fuselage 22 extending along longitudinal axis A, wings 24a, 24b extending along lateral axis B from sides of the fuselage 22, nacelles 23a, 23b attached to the wings 24a, 24b, a cockpit 26 at a front end 28 of the fuselage 22, a tail 30 at a back end 32 of the fuselage 22, heat sources 34a, 34b, 34c, heat exchange systems 36, 38a, 38b, and a skin 40. The skin 40 forms an outer surface of the aircraft 20. The skin 40 may include aircraft panels assembled together to form a portion of the skin 40.

Each heat source 34a, 34b, 34c may be any heat generating component, such as an MFFCS, an electronic heat generating panel, an APU, or an engine of the aircraft 20. Each heat source 34a, 34b, 34c may be located in and/or on the fuselage 22 or another portion of the aircraft 20, such as the cockpit 26, wings 24a, 24b, or tail 30. Each heat source 34a, 34b, 34c may be thermally connected to one or more of the heat exchange systems 36, 38a, 38b to transfer heat from the heat source 34a, 34b, 34c to the heat exchange systems 36, 38a, 38b.

One or more parts of the aircraft 20 may include a laminar flow control system including an external portion of the skin 40 with a foraminous portion 50. An external fluid may flow through the foraminous portion 50 to transfer heat from the heat exchange system 36, 38a, 38b to the fluid flowing through the foraminous portion 50. The foraminous portion is provided so as to maintain the profile of the corresponding surface of the vehicle part to provide for and to maintain laminar flow characteristics of the external fluid flowing over the external skin, while some of the external fluid flows through the foraminous portion. The fluid that flows through the foraminous portion may impinge a thermally conductive surface of the corresponding heat exchange system 36, 38a, 38b to absorb heat from the thermally conductive surface. For example, the fluid may impinge the thermally conductive surface 52 of the heat exchange system 36 by flowing through the foraminous portion 50 of the tail 30.

Referring particularly to FIG. 1B, the heat exchange system 36 may include a first thermal connection 54 for receiving heat from the heat source 34a and transferring the received heat to a heat exchanger 56. The heat exchange system 36 may also include a second thermal connection 58 for transferring heat from the heat exchanger 56 to the thermally conductive surface 52, which may be located adjacent to the foraminous portion 50. The heat exchange systems 38a, 38b (shown in FIG. 1A) may operate similarly to the heat exchange system 36 in conjunction with a corresponding foraminous portion of the wings 24a, 24b.

The thermally conductive surface 52 may be configured to transfer heat from the corresponding heat source 34a to the fluid, e.g., air, flowing through the corresponding foraminous portion 50. The thermally conductive surface 52 may be formed by any suitable thermally conductive component, components or thermally conductive device configured to transfer heat to the air received from the foraminous portion 50. For example, the thermally conductive surface 52 and foraminous portion 50 may be produced by additive manufacturing techniques. The thermally conductive surface 52 and the foraminous portion 50 may be composed of a multi-layer spatially varying material with varying thermal and mechanical properties. The thermally conductive surface 52 may be at least partially formed by a thermally conductive material with a minimum conductivity of 20 watts per meter kelvin (herein referred to as "W/(m*K)"). Other areas of the thermally conductive surface may have a significantly higher thermal conductivity of its material, e.g., 400 W/(m*K). For example, the thermally conductive surface may be made of an aluminum material, such as aluminum, aluminum alloys, nickel alloy, titanium, titanium alloy, copper, graphite foam, or any combination thereof.

The thermally conductive surface 52 may be located adjacent to a foraminous portion 50 of the skin 40 at a leading edge 60 of a vertical stabilizer 62 of the tail 30. For example, the thermally conductive surface of one of the heat exchange systems may be located within the vertical stabilizer 62 extending along a vertical axis C of the aircraft 20. In another embodiment, the first thermal connection and/or parts of the second thermal connection form a portion of the thermally conductive surface.

In an embodiment, the thermally conductive surface is located adjacent to a foraminous portion of the skin at or downstream of a leading edge of one or more of the wings, engine nacelles, and/or the tail. For example, the thermally conductive surface may be adjacent to a foraminous portion of a leading edge and adjacent to a downstream surface of one or more of the wings and/or nacelles to transfer heat to air flowing through the foraminous portion of the wings and/or nacelles. Exemplary thermally conductive surfaces, such as various shapes and additional features, are detailed below and interchangeable with one another.

The first thermal connection 54 is configured to transfer heat from the corresponding heat source 34a to the heat exchanger 56. The first thermal connection 54 may include any suitable thermal connection, such as one or more thermally conductive conduits, one or more thermally conductive plates, and/or one or more fluid carrying conduits. In an embodiment, the first thermal connection is at least partially formed by a portion of the corresponding heat exchanger. For example, the first thermal connection may be at least partially formed by an aluminum plate of the heat exchanger, with a face of the aluminum abutting or exposed to the heat source, and with an opposite face of the aluminum plate exposed a coolant fluid flowing through the heat exchanger to transfer heat from the aluminum plate to the coolant fluid.

The heat exchanger 56 may be any suitable heat exchanger type, such as a plate heat exchanger, a tube heat exchanger, a shell and tube heat exchanger, a plate fin heat exchanger, or any other suitable heat exchanger. In an embodiment the heat exchanger forms a portion of the thermally conductive surface. In another embodiment, the heat exchanger forms the entire thermally conductive surface.

The second thermal connection 58 may be configured to transfer heat from the corresponding heat exchanger 56 to the thermally conductive surface 52. The second thermal connection 58 may include any suitable thermal connection or thermal coupling, such as one or more thermally conductive conduits, one or more thermally conductive plates, and/or one or more fluid carrying conduits. In an embodiment, the second thermal connection is at least partially formed by a portion of the heat exchanger. For example, the second thermal connection may be at least partially formed by an aluminum plate of the heat exchanger, with a face abutting or exposed to the thermally conductive surface, and an opposite face of the aluminum plate exposed to a coolant fluid flowing through the heat exchanger to transfer heat from the coolant fluid to the aluminum plate. In another embodiment, the second thermal connection at least partially forms the thermally conductive surface. In a further embodiment, the second thermal connection is at least partially formed by the heat exchanger and at least partially forms the thermally conductive surface.

During use of the aircraft 20, a synergy between the laminar suction flow system (leading to a reduction in drag of the aircraft 20) and the heat exchange system 36, 38a, 38b (rejecting heat from the heat sources 34a, 34b, 34c) occurs. Synergy occurs as the suction air travelling through the corresponding foraminous portion 50 absorbs heat originating from the heat sources 34a, 34b, 34c while allowing for enhanced laminar flow characteristics of the external air flowing along a corresponding external portion of the foraminous portion 50. For example, a pump (not shown) may suction air through the corresponding foraminous portion 50 to transfer heat to the air and to enhance laminar flow characteristics of the external air flowing over the laminar flow control surface.

The air travelling through the foraminous portion 50 is received internally. The air travelling through allows a reduction of turbulence of the air travelling externally along the outer surface of the leading edge 60 of the vertical stabilizer 62. Turbulence is reduced by enhancing the laminar flow characteristics of the external air, thereby reducing a drag coefficient of the vertical stabilizer 62. The reduced drag coefficient of the vertical stabilizer 62 allows a drag reduction of the aircraft 20. A portion of the external air may stagnate at or near a stagnation line of the corresponding portion of the aircraft 20. For example, at or near the stagnation line, a rate of air flow may be reduced or may be a rate of zero.

The internal air travels through the foraminous portion to receive heat from the thermally conductive surface 52. After the internalized suction air receives heat, the internal air may be exhausted to any suitable location. For example, the internal air may be exhausted from the aircraft 20 at the back end 32 of the aircraft 20, such as through a port in the vertical stabilizer 62 or an auxiliary power unit exhaust. In an embodiment, the internalized suction air is conditioned and directed to a portion of the aircraft, such as a cabin within the fuselage to warm and/or further cool a portion of the cabin depending on a desired cabin temperature and the amount of heat transferred from the heat exchanger to the internalized suction air.

The heat exchanger 56 may receive heat from the heat source via the first thermal connection 54 and may transfer heat to the thermally conductive surface 52 via the second thermal connection 58. For example, a first coolant fluid may flow through the first thermal connection 54 to absorb heat from the heat source and continue flowing to transfer the absorbed heat to the heat exchanger 56. The first coolant fluid may be any suitable heat transfer fluid, such as air, ethylene glycol, water, oil, refrigerant, or the like.

A second coolant fluid may flow through the second thermal connection 58 to absorb heat from the first coolant fluid via the heat exchanger 56 to transfer heat to the thermally conductive surface 52. The heat may then transfer from the thermally conductive surface 52 to the internalized suction air flowing through the corresponding foraminous portion 50. The second coolant fluid may be any suitable heat transfer fluid, such as air, ethylene glycol, water, oil, refrigerant, or the like. In an embodiment, the first thermal connection and the second thermal connection form one or more contiguous fluid conduits for a single coolant fluid to absorb heat from the heat source and transfer heat to the internally flowing suction air. In another embodiment, heat is transferred from the heat source to the thermally conductive surface and from the thermally conductive surface to the internalized suction air via any other suitable heat transfer method.

Turning now to FIGS. 2A-2D, a portion of an aircraft is shown at 120. The aircraft 120 is substantially the same as the above-referenced aircraft 20, and consequently the same reference numerals but indexed by 100 are used to denote structures corresponding to similar structures in the aircraft. In addition, the foregoing description of the aircraft 20 is equally applicable to the aircraft 120 except as noted below. Moreover, it will be appreciated that aspects of the aircraft may be substituted for one another or used in conjunction with one another where applicable.

Figure 2A:
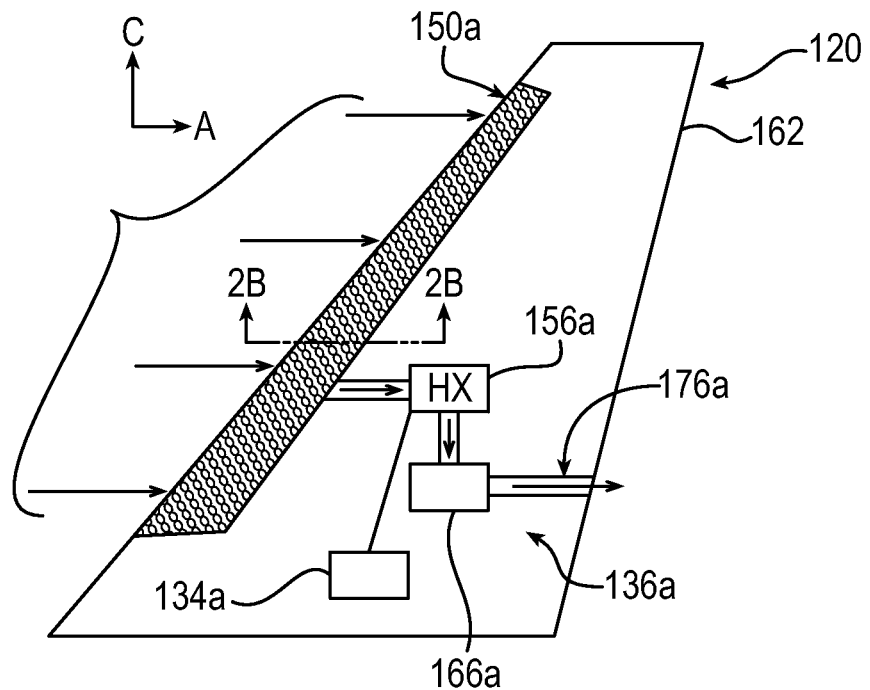
FIG. 2A is a side view of a tail (i.e., the vertical stabilizer) of the vehicle of FIG. 1A.
Figure 2B:
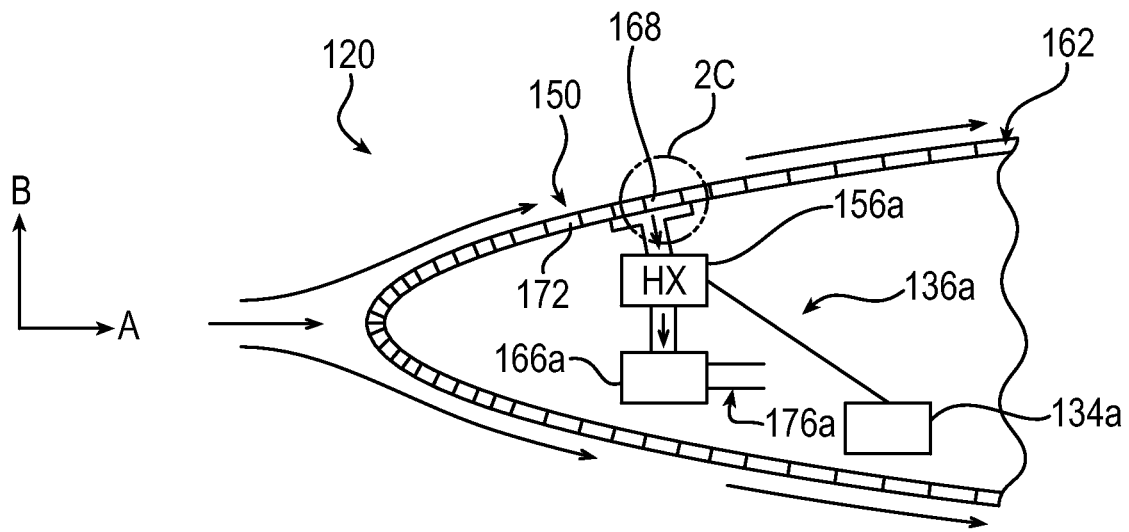
FIG. 2B is a fragmentary cross-section view of the tail of the vehicle showing a foraminous portion of the skin and inner sheet of the tail of FIG. 2A.
Figure 2C:
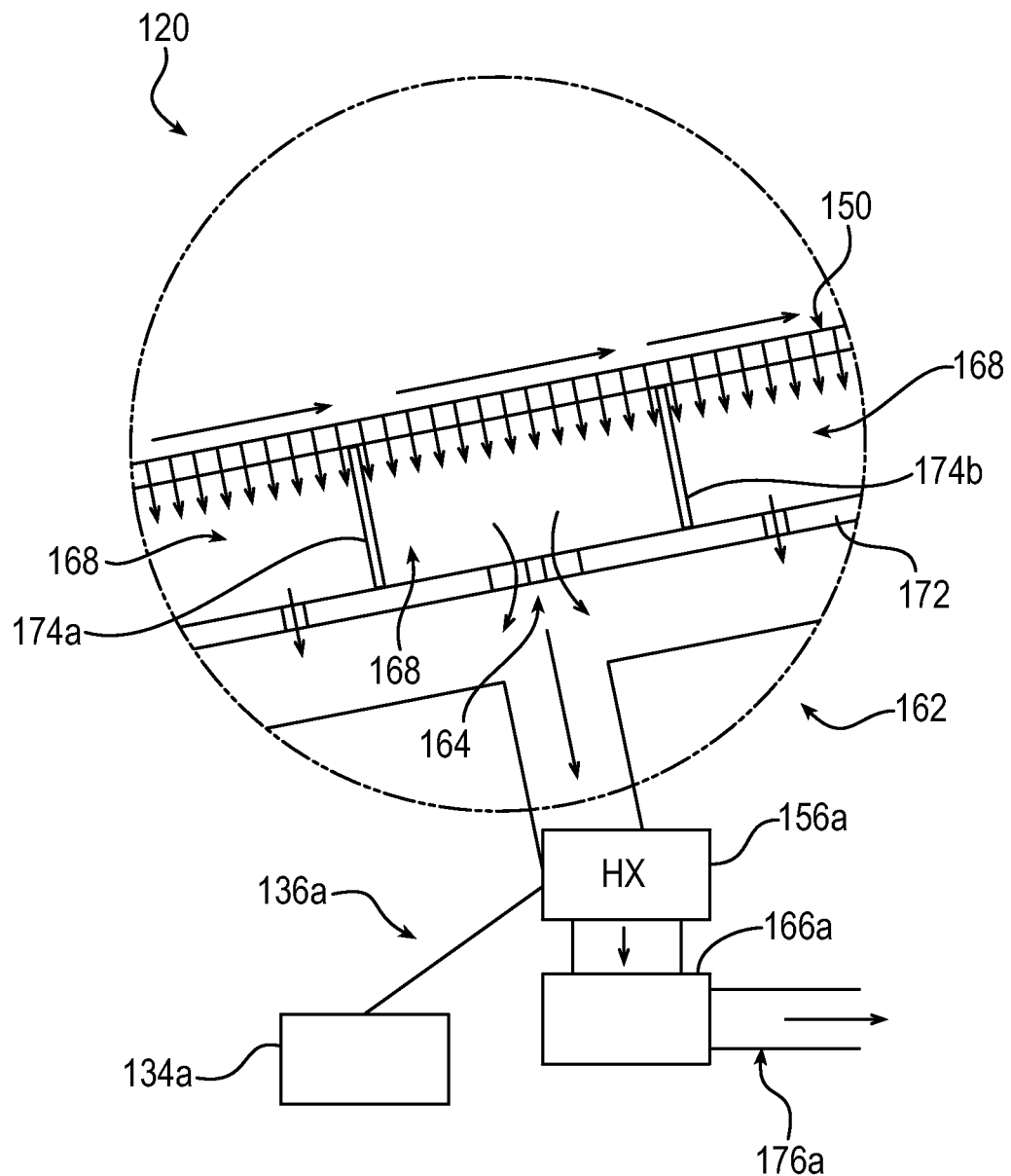
FIG. 2C is an enlarged cross-section view of a portion of the foraminous portion and the inner sheet of FIG. 2B and a schematic representation of a pump fluidly connected to the inner sheet and the heat exchanger of FIG. 1A.

The aircraft 120 may include a skin forming an outer surface of a vertical stabilizer 162 having a foraminous portion 150a. The aircraft 120 may also include a heat exchange system 136a having multiple restrictive orifices 164 (shown in FIG. 2C) and having a fluid pump 166a fluidly connected to the foraminous portion 150a. The fluid pump may be located downstream (with respect to the fluid flowing through the foraminous portion 150a) as shown in FIG. 2C, or it may be located between the heat exchanger and the foraminous portion 150a (e.g., upstream of the heat exchanger). The size of the orifices 164 might be variable or fixed and controls the suction flow through different sections of the foraminous surface. The fluid pump 166a and the orifices 164 may be configured to reduce pressure in the interior flow cavities 168 partially defined by the foraminous portion 150a to induce external air to flow through the foraminous portion 150a. For example, the fluid pump 166a and/or the orifices 164 may be part of a laminar flow control system and the pump may suction air through the foraminous portion 150a. In an embodiment, a sensor detects the air flowing through the various sections of the foraminous portion and a controller operates the pump and/or the orifices to regulate air mass flow through various sections of the foraminous portion. In another embodiment, a sensor detects the near wall flow characteristics of the external air flow and a controller operates the pump and orifices to enhance laminar flow of the external air flow and reduce drag forces on the vertical stabilizer.

The restrictive orifices 164 consolidate air flowing from the foraminous portion 150a to create an impinging stream of air jets. The number of restrictive orifices 164 per interior flow cavity 168 may vary. The number and size of the orifices per cavity 168 may determine the mass flow through the corresponding foraminous portion 150a. The individual orifice sizes may determine the character of the air jets emanating from the orifices 164. The air jets may be directed to a thermally conductive surface (shown in FIG. 3) thermally connected to a heat exchanger 156a of the heat transfer system 136a for effectively transferring heat from the heat exchanger 156a to the internalized suction air flow via the thermally conductive surface. Details of an embodiment utilizing the restrictive orifices 164 to facilitate heat transfer are discussed below regarding FIGS. 3 and 4.

Figure 3:
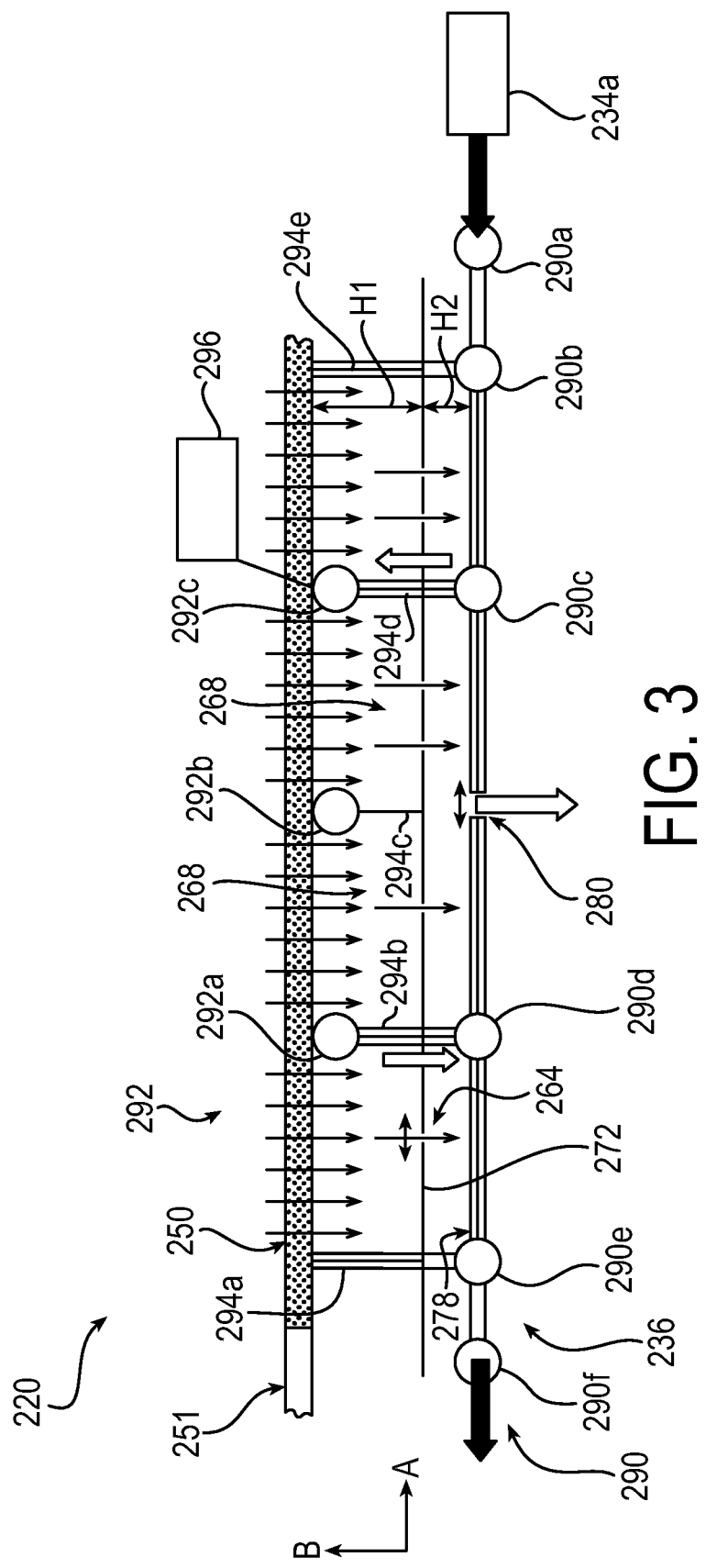
FIG. 3 is a cross-section of another exemplary foraminous portion and inner sheet of a vehicle, and a cross-section view of an exemplary portion of a heat exchanger.

The restrictive flow orifices 164 may be formed by an opening in an inner sheet 172, which is spaced apart from the foraminous portion 150a and is spaced in between a pair of laterally extending walls 174a, 174b. Each orifice 164 may have a diameter based on a distance H2 from a thermally conductive surface (as shown in FIG. 3). The diameter and or H2 may be based on an optimal Reynolds number of flow through the orifice. For example, a ratio of diameter/H2=6 may be used, and/or a Reynolds number of 23,000 may be provided.

The laterally extending walls 174a, 174b may extend vertically along the foraminous portion and laterally between the inner sheet and the foraminous portion to define the interior flow cavity 168. For example, the laterally extending walls 174a, 174b may extend along a vertical axis C, which is perpendicular to a longitudinal axis A and a lateral axis B.

The laterally extending walls 174a, 174b may have a lateral end connected to the foraminous portion 150a and an opposite lateral end connected to the inner sheet 172 to form the interior flow cavity 168. Air received in the interior flow cavity 168 via the foraminous portion 150a flows out of the interior flow cavity 168 through the restrictive orifices 164 to receive heat from the heat exchanger 156a. In an embodiment, some air exits the interior flow cavity through an opening other than the restrictive orifice.

Longitudinally extending walls (not shown) may be vertically spaced apart along the laterally extending walls and have a lateral end connected to the foraminous portion and an opposite lateral end connected to the thermally conductive surface of the heat exchanger to further define the interior flow cavity 168.

Drag reduction of the aircraft 120 and heat absorption from a heat source 134a may be enhanced by using the fluid pump 166a. Heat absorption from the heat source 134a may be enhanced by using the restrictive orifices 164. The rate of air travelling through the corresponding foraminous portions 150a may be increased or decreased by the pump 166a and/or based on sizes of diameters of each of the restrictive orifices 164. Modifying a rate of operation of the pump 166a or the diameters of the restrictive orifices 164 may increase or decrease the amount of internalized suction air flow.

The fluid pump 166a may be used to increase air flow through the orifice and, thus, draw more air through the foraminous portion 150a to improve the drag coefficient of the vertical stabilizer 162. Increasing the suction flow or internal air flow, e.g., the air that flows through the interior flow cavity 168 and the orifices 164, may increase the rate of heat absorption achieved by air jets emanating from the orifices 164 and impinging onto the thermally conductive surface (see FIG. 3). The pump 166a may adjust the rate of internalized suction air flow based on the characteristics of the near wall external air flow over the corresponding foraminous portion 150a. Alternatively, the pump 166a may adjust the rate of internalized suction air flow based on the amount of heat produced by the heat source 134a. Depending on aircraft needs, the pump 166a may increase or decrease the internal air flow to optimize external flow and to reduce drag forces against the aircraft 120. Alternatively, the pump 166a may increase the rate of internalized suction air flow to tend to maximize heat transfer from the heat source 134a to transfer heat at an increased rate from the heat source 134a.

After the suction air travels through the foraminous portion and having already achieved the desired drag reduction by means of a regulated suction mass flow, additional control of the restrictive orifices 164 may optimize the internalized suction air flow to form an impinging air jet array. The impinging air jet array may be focused on the thermally conductive surface(s) thermally connected to the heat exchanger 156a to absorb heat from the thermally conductive surface(s) (shown in detail in FIGS. 3 and 4). The focused impinging jets of internal air allow for a greater rate of heat absorption from the thermally conductive surface(s). The rate of mass flow through each flow cavity 168 may be controlled by keeping the total effective orifice area for the sum of orifices 164 pertaining to a given flow cavity 168 the same.

Absorbing a higher rate of heat from the thermally conductive surface(s) allows a higher rate of heat transfer from the heat exchanger 156a. The higher rate of heat transfer from the heat exchanger 156a allows a higher rate of heat transfer from the heat source 134a to the heat exchanger 156a. Thus, the increasing the rate of heat transfer from the thermally conductive surface(s) to the internalized suction airflow may increase the rate of heat transfer from the heat source 134a.

After heat is transferred to the internalized air flow, the internalized air flow may be exhausted out an exhaust line 176a of the heat exchange system 136a. For example, the exhaust line 176a may lead to the back end of the vertical stabilizer 162, as shown in FIG. 2A or it might lead to the back end of the engine nacelle 123 where the internalized suction airflow may be exhausted to mix with the engine bypass air, as shown in FIG. 2D.

Figure 2D:
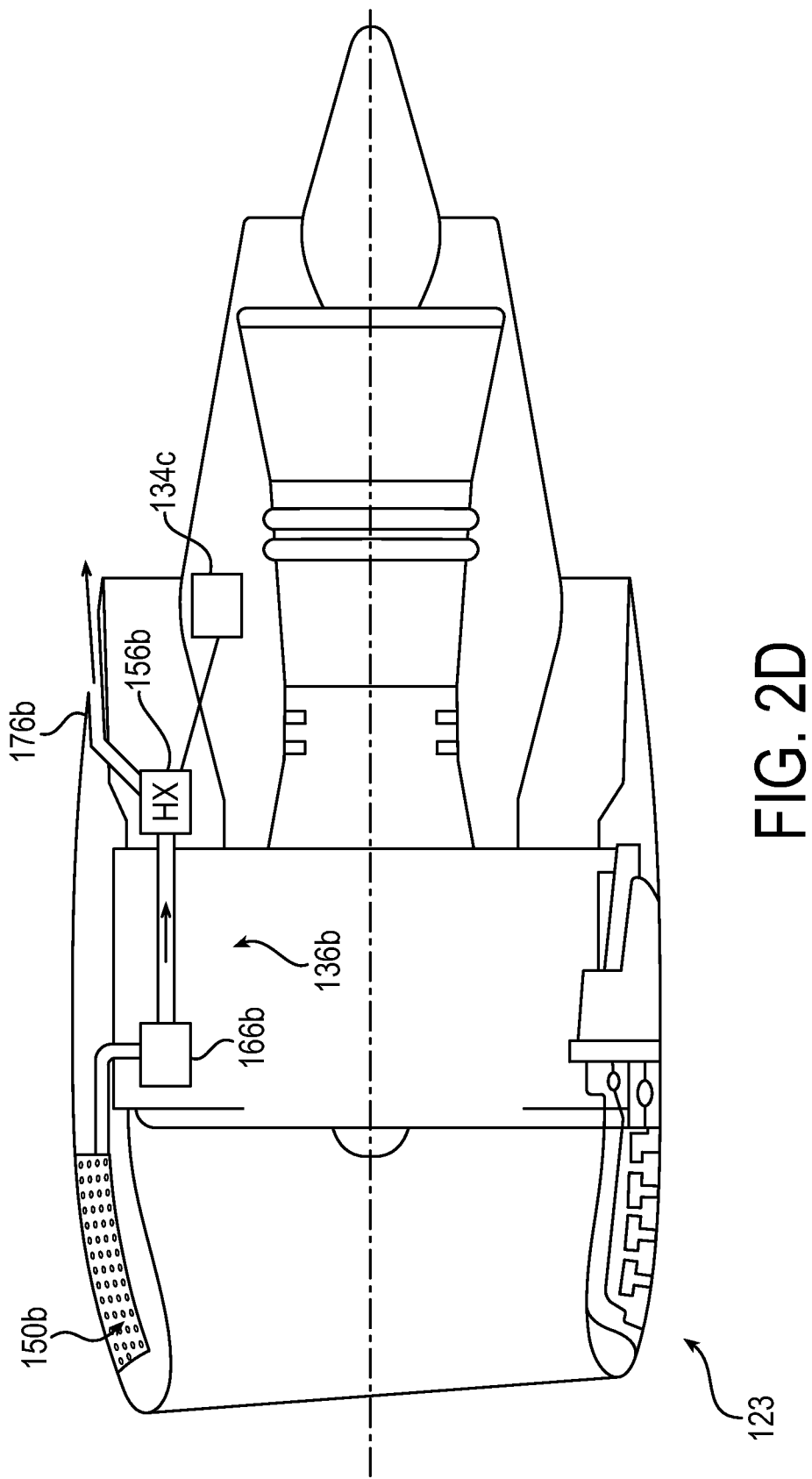
FIG. 2D is a side view of a portion of one of the engine nacelles of the vehicle of FIG. 1A.

FIG. 2D is a side view of the engine nacelle 123. The engine nacelle 123 may include a laminar flow control surface extending along a leading edge of an outer surface of the engine nacelle 123. The laminar flow control surface may include a foraminous portion 150b for allowing external fluid to flow therethrough and for enhancing laminar flow characteristics of a portion of the external fluid that flows over the laminar flow control surface.

A fluid pump 166b may be in fluid communication with the foraminous portion 150b for inducing air flow through the foraminous portion 150b toward a heat exchanger 156b. The fluid pump 166b may be any suitable fluid pump, such as the fluid pump 166a. Similarly, the heat exchanger 156b may be any suitable heat exchanger, such as the heat exchanger 156a.

The heat exchanger 156a may be thermally connected to a heat source 134c, which may be any suitable heat source, such as an engine located within the engine nacelle 123.

During use of the engine nacelle 123, external fluid may impinge the foraminous portion 150b. Some of the external fluid may flow through the foraminous portion 150b to the heat exchanger to absorb heat from the heat exchanger. The pump 166b may increase or decrease the amount of external fluid flowing through the foraminous portion 150b.

The heat exchanger 156b may absorb heat from the heat source, such as the engine, via a thermal connection. The heat exchanger 156b may also expel heat to the portion of the external fluid that is travelling interiorly from the foraminous portion 150b. After the interiorly travelling fluid absorbs heat from the heat exchanger 156b, the interiorly travelling fluid may be expelled via an exhaust channel 176b located at a trailing end of the engine nacelle 123.

Turning now to FIG. 3, a portion of an aircraft is shown at 220. The aircraft 220 is substantially the same as the above-referenced aircraft 20, 120, and consequently the same reference numerals but indexed by 200 are used to denote structures corresponding to similar structures in the aircraft. In addition, the foregoing descriptions of the aircraft 20, 120 are equally applicable to the aircraft 220 except as noted below. Moreover, it will be appreciated that aspects of the aircraft may be substituted for one another or used in conjunction with one another where applicable.

The aircraft 220 may include one or more foraminous portions 250, a non-foraminous portion of skin 251, and one or more heat exchange systems 236. The heat exchange system 236 may have an inner sheet 272, which has restrictive orifices 264, and one or more thermally conductive surfaces. Some of the thermally conductive surfaces receive fluid (e.g., air) from a respective orifice(s) 264 for transferring heat to fluid travelling through the foraminous portion 250.

The foraminous portion 250, for example, as used in the several embodiments, may be formed of a microporous layer, a porous titanium layer, and/or a titanium skin with laser drilled holes. Hole sizes for a perforated-type foraminous portion may be in the range of the order of 50 to 500 microns with a hole to hole spacing of 500-1000 microns. The foraminous portion 250 may be formed of any other suitable foraminous portion for allowing fluid flow through the foraminous portion 250 and enhancing laminar flow characteristics of fluid flowing externally adjacent or near the foraminous portion 250.

An example of a thermally conductive surface may be a portion of a thermally conductive panel 278 extending laterally and vertically along the corresponding foraminous portion 250 and/or extending along the inner sheet 272. The thermally conductive panel 278 may be formed of any suitable thermally conductive material, such as aluminum, aluminum alloy, nickel alloy, copper. In an embodiment, a portion of the thermally conductive panel facing away from the foraminous portion is formed of a thermally insulating material to prevent heat transfer from the thermally conductive panel to the interior of the aircraft.

The shape of the thermally conductive panel 278 may be any suitable shape, such as a flat sheet or a sheet conforming to a corresponding profile of the corresponding foraminous portion 250.

An exhaust opening 280 may extend laterally through the thermally conductive panel 278. The exhaust opening 280 provides a pathway for the internalized suction air to flow from the foraminous portion 250 via the restrictive orifices 264 to the thermally conductive panel 278 and to exhaust out of the aircraft 220 or to another portion of the aircraft 220. The exhaust opening 280 may be located at any suitable location and may be directed to any suitable portion of the aircraft 220 to allow exhaust of the internalized suction air flow. In an embodiment, more than one exhaust opening in the thermally conductive panel extends laterally through the thermally conductive panel to allow the internal air flow to exhaust.

The inner sheet 272 may be spaced a distance H1 from the foraminous portion and a distance H2 from the thermally conductive panel based on expected rates of internal air flow through the foraminous portion 250 and heat generation by one or more heat sources 234a. The inner sheet 272 may receive heat from the thermally conductive panel 278 and/or another component of the heat exchange system 236, such as a conductive fluid conduit 290a-290f, 292a-292c or a divider wall 294a-294e.

The inner sheet 272 may be made of a thermally conductive material to transfer heat received to the internalized air airflow. For example, the inner sheet 272 may be at least partially formed by a thermally conductive material with a minimum conductivity of 2 W/(m*K). Other areas of the inner sheet 272 may have a significantly higher thermal conductivity of its material, e.g., 400 W/(m*K). For example, the inner sheet (and other sections of the heat exchange system 236) may be produced by macrolaminate or additive manufacturing technology and be made of an composite material, aluminum material, such as aluminum, aluminum alloys, nickel alloy, titanium, titanium alloy, copper, graphite foam, or any combination thereof. Material selection may depend on the desired heat transfer characteristics, may depend on structural support provided by the inner sheet 272, and may depend on pressure losses incurred by the internalized suction air flow passing through the heat exchange system 236.

The inner sheet 272 may include multiple restrictive orifices 264. The restrictive orifices 264 are longitudinally spaced apart to focus the internalized suction air flow toward the thermally conductive surface of the thermally conductive panel 278. The number and size of the restrictive orifices 264 may be based on the air flow rate through the foraminous portion and the desired characteristics of the air jets emanating from the orifices and impinging on the thermally conductive panel 278 when the aircraft 220 is at a cruising speed.

The restrictive orifices 264 may be fixed in size or their size might be adjustable. The restrictive orifices 264 may also be spaced from the thermally conductive panel based on the air flow rate through the foraminous portion when the aircraft 220 is at a cruising speed and depending on the size range of the orifices 264. In an embodiment, the restrictive orifice is spaced from the foraminous portion based on the air flow rate through the foraminous portion, the total number of orifices per interior flow cavity and the specific size-range and distribution of the orifices when the aircraft is at a cruising speed. In another embodiment, the restrictive orifice has a diameter and a spacing from the foraminous portion and the thermally conductive panel to maximize or optimize heat transfer from the thermally conductive surfaces of the thermally conductive panel to the internalized suction air flow.

Thermally conductive surfaces may be formed by one or more of thermally conductive fluid conduits 290a-290f, 292a-292c thermally connected to a portion of the thermally conductive panel 278, the foraminous portion 250, and/or the divider walls 294a-294e. The thermally conductive fluid conduits 290a-290f, 292a-292c may be made of a thermally conductive material to form another thermally conductive surface for transferring heat to the internal air flow. For example, the thermally conductive conduits may be at least partially formed by a thermally conductive material with a minimum conductivity of 2 W/(m*K).

Other areas of the thermally conductive conduits may have a significantly higher thermal conductivity of its material, e.g., 400 W/(m*K). For example, the thermally conductive conduits (and other sections of the heat exchange system 236) may be produced by macrolaminate or additive manufacturing technology and be made of an composite material, aluminum material, such as aluminum, aluminum alloys, nickel alloy, titanium, titanium alloy, copper, graphite foam, or any combination thereof. Material selection may depend on the desired heat transfer characteristics, may depend on the structural support provided by the thermally conductive conduits, and may depend on pressure losses incurred by the internalized suction air flow passing through the heat exchange system 236.

The thermally conductive fluid conduits 290a-290f, 292a-292c may each extend vertically to allow fluid flow through each conduit along a vertical length—perpendicular to a longitudinal axis A and a lateral axis B—of the thermally conductive panel 278 and the foraminous portion 250. Extending the thermally conductive fluid conduits 290a-290f, 292a-292c vertically allows a greater surface area of each thermally conductive fluid conduit 290a-290f, 292a-292c to be exposed to the internal air and in turn allows the fluid within to increase the rate of heat transfer to the internalized suction air via the thermally conductive fluid conduits 290a-290f, 292a-292c. Also, the thermally conductive fluid conduits 290a-290f, 292a-292c to may bring hot-side heat transfer fluid to the foraminous portion 250 and/or to the neighboring aircraft skin surface 252, for additional heat rejection (e.g., directly to the external air flow) and to improve laminar flow characteristics even further.

A first set 290, e.g., the thermally conductive fluid conduits 290a-290f, may be arranged to receive heat from the heat source 234a and may be longitudinally spaced apart along the thermally conductive panel 278 to transfer heat received from the heat source 234a to the thermally conductive panel 278. The thermally conductive fluid conduits 290b-290e may also connect to an end of some of the divider walls 294a, 294b, 294d, 294e to transfer heat to the divider walls 294a-294e from the thermally conductive fluid conduits 290b-290e. Examples of suitable heat transfer fluids include ethylene glycol, water, oil, and/or another refrigerant fluid.

The thermally conductive fluid conduits 290b-290e may connect to and guide heat transfer fluid to a second set 292, e.g., the thermally conductive conduits 292a-292c. Alternatively, the second set 292 may be arranged to receive heat directly from the heat source 234a.

The second set 292 may be laterally offset from the first set 290 toward the foraminous portion 250 to transfer heat to the foraminous portion 250. The thermally conductive fluid conduits 292a-292c of the second set 292 may also connect to another end of some of the divider walls 294b, 294c, 294d to transfer heat to the divider walls 294b, 294c, 294d from those thermally conductive fluid conduits 292a-292c.

One or more of the thermally conductive conduits 292a-292c and/or 290a-290f, may be fluidly coupled to a valve 296 for controlling fluid flow through each fluidly coupled conduit, e.g., the thermally conductive conduit 292c. The valve 296 allows directing fluid flow to tend to maximize or otherwise control heat transfer. The valve 296 may also allow directing fluid flow to one or more of the thermally conductive conduits 292a-292c adjacent the foraminous portion 250 to prevent icing or to de-ice the corresponding foraminous portion 250.

The divider walls 294a-294e may be longitudinally spaced between some of the restrictive orifices 264 and each may extend laterally from an end connected to one of the thermally conductive conduits 290b-290e of the first set 290 of thermally conductive conduits or from the inner sheet 278. The divider walls 294a-294e allow a division of the internalized suction air flow, formation of the internal flow cavities 268 and guiding of the internalized suction airflow. The divider walls 294a-294e may guide the internalized suction airflow to the orifices 264 of the inner sheet. In case of divider walls 294b and 294d the internalized suction airflow may be guided—along the thermally conductive panel 278 after impingement of the air discharging from the orifices 264. Dividing the internalized suction air with the internal flow cavities allows control of local suction mass flow along the foraminous portion 250 while at the same time allowing control of the heat transfer characteristics after internalization of the suction air flow.

Another end of the divider walls 294a-294e may be connected to the foraminous portion 250 and/or to one of the thermally conductive conduits 292a-292c of the second set 292. Connecting the other end allows the divider walls 294a-294e to restrict air from flowing longitudinally. Restricting the air flow facilitates local control of air suction flow and guiding the internalized suction air flow to enhance heat absorption from the thermally conductive surfaces.

The divider walls 294a-294e may be made of a thermally conductive material to provide another thermally conductive surface for heat transfer to the internal air flow. For example, the divider walls 294a-294e may be at least partially formed by a thermally conductive material with a minimum conductivity of 2 W/(m*K).

Other areas of the divider walls 294a-294e may have a significantly higher thermal conductivity of its material, e.g., 400 W/(m*K). For example, the divider walls 294a-294e (and other sections of the heat exchange system 236) may be produced by macrolaminate or additive manufacturing technology and be made of an composite material, aluminum material, such as aluminum, aluminum alloys, nickel alloy, titanium, titanium alloy, copper, graphite foam, or any combination thereof. Material selection may depend on desired heat transfer characteristics, may depend on structural support provided by the divider walls 294a-294e, and may depend on pressure losses incurred by the internalized suction air flow passing through the heat exchange system 236.

In a further embodiment, one or more of the divider walls may be a fluid conduit fluidly connected with one or more of the fluid conduits to transfer heat to the internal air flow. and the divider walls and/or the fluid conduits may exchange heat transfer fluid with each other.

During use of the aircraft 220, coolant fluid may absorb heat from the heat source and flow through the thermally conductive fluid conduits 290a-290f, 292a-292c to transfer the absorbed heat to the thermally conductive fluid conduits 290a-290f, 292a-292c. As the thermally conductive fluid conduits absorb the heat, the thermally conductive panel 278 and the divider walls 294a, 294b, 294d, 294e may absorb heat from the fluid conduits 290a-290f, 292a-292c.

The valve 296 may direct some of the coolant fluid to the second set 292 of fluid conduits 292a-292c—adjacent the foraminous portion 250—to transfer heat from the fluid conduits 292a-292c to the foraminous portion. Transferring heat from the second set 292 of fluid conduits 292a-292c to the foraminous portion allows de-icing of the foraminous portion 250 and/or increasing the rate of heat transfer from the heat source 234a via the coolant fluid.

The coolant fluid may flow through one or more of the divider walls 294a-294e and the divider walls 294a-294e may transfer heat to the interior air flow. Transferring heat via coolant fluid in the divider walls 294a-294e may allow greater rates of heat transfer to the internalized suction air flow, which allows a greater temperature reduction of the returning coolant fluid.

The coolant fluid flows through the fluid conduits 290a-290f, 292a-292c to cool the coolant fluid. The coolant fluid may flow through a return conduit, e.g., fluid conduit 290f, back to the heat source to re-absorb heat from the heat source. Alternatively, a return line may be formed by a manifold (not shown) fluidly connected to the fluid conduits at a vertical end of the fluid conduits.

The internalized suction air, after flowing through the foraminous portion 250, may absorb heat from the thermally conductive surfaces of the fluid conduits 290a-290f, 292a-292c, the divider walls 294a-294e and the inner sheet 272. The internalized suction air may also flow through each restrictive orifice 264 to form a plurality of air jets to impinge onto the thermally conductive surface of the thermally conductive panel 278 to absorb heat from the thermally conductive panel 278 and to facilitate further heat transfer from the fluid conduits 290a-290f, 292a-292c, 294a-294e. The internalized suction air may flow along the thermally conductive panel 278, guided by sections of the divider walls (294b, 294d) and exhaust laterally out the exhaust opening 280 to an external portion of the aircraft 220 or to an internal portion of the aircraft 220. For example, at least some of the exhaust air may flow to a cabin of the aircraft 220 to increase or decrease the temperature of air within the cabin.

Figure 4:
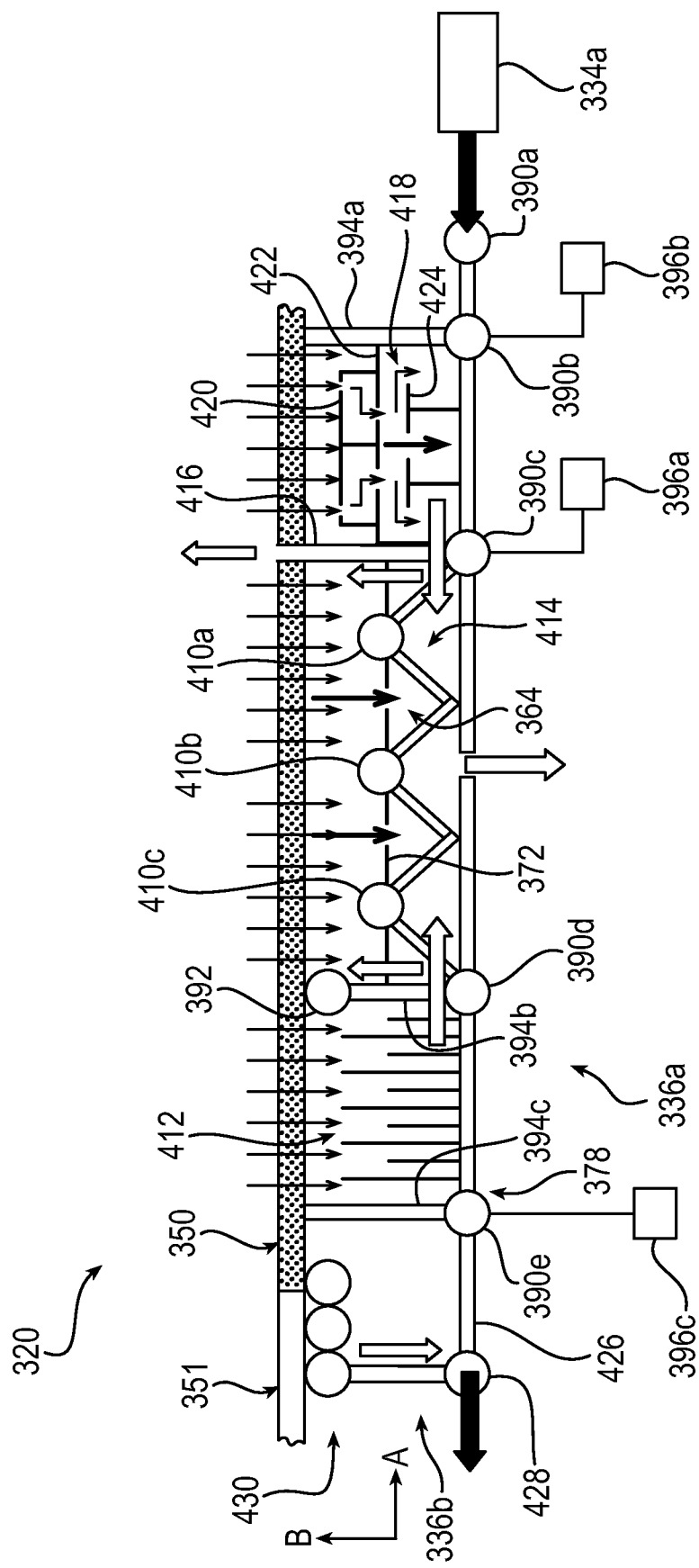
FIG. 4 is a cross-section view of a further exemplary foraminous portion, and a cross-section view of a further exemplary portion of a heat exchanger.

Turning now to FIG. 4, a portion of an aircraft is shown at 320. The aircraft 320 is substantially the same as the above-referenced aircraft 20, 120, 220, and consequently the same reference numerals but indexed by 300 are used to denote structures corresponding to similar structures in the aircraft. In addition, the foregoing descriptions of the aircraft 20, 120, 220 are equally applicable to the aircraft 320 except as noted below. Moreover, it will be appreciated that aspects of the aircraft may be substituted for one another or used in conjunction with one another where applicable.

The aircraft 320 may include a first heat exchange system 336a having one or more thermally conductive surfaces configured to transfer heat from a heat source 334a to suction air flow through a foraminous portion 350. The first heat exchange system 336a may have a de-icing conduit 410 for transferring heat and/or de-icing fluid to the foraminous portion 350. The aircraft 320 may also include a second heat exchange system 336b thermally connected with the first heat exchange system 336a to transfer additional heat from the heat source 334a. A non-foraminous portion 351 may abut the foraminous portion 350 to reduce air flow or prevent air flow to a portion of the second heat exchange system 336b.

The first heat exchange system 336a may include thermally conductive surfaces formed by a thermally conductive panel 378, a plurality of thermally conductive fluid conduits 390a-390e, 392, 410a-410c, a plurality of thermally conductive parallel plates 412, divider walls 394a-394c, 416, thermally conductive triangular plates 414, an inner sheet 372, a de-icing channel 416, and thermally conductive cascading sheets 418.

Each of the parallel plates 412 may extend vertically, as shown, or at an angle along the thermally conductive panel 378 and may extend laterally from the thermally conductive panel 378 to transfer heat from the thermally conductive panel 378. The parallel plates 412 allow a greater thermally conductive surface area compared to the thermally conductive panel 378 alone. Thus, a rate of heat transfer from the parallel plates 412 and the thermally conductive plate 378 may be greater than the thermally conductive panel 378 alone.

The triangular plates 414 may extend vertically—along a vertical axis C—along the thermally conductive panel 378 and in a zig-zag pattern—along a longitudinal axis A—to thermally connect to the thermally conductive fluid conduits 410a-410c and to the thermally conductive panel 378. The thermally conductive fluid conduits 410a-410c may be laterally spaced between the thermally conductive panel 378 and the foraminous portion 350. Each thermally conductive fluid conduit 410a-410c may be longitudinally spaced along the inner sheet 372 and form an apex at an end of corresponding triangular plates 414 to transfer heat from the fluid conduit 410a-410c to the triangular plates 414.

The inner sheet 372 may extend longitudinally opposite the thermally conductive panel 378 relative to the triangular plates 414 to align respective longitudinally spaced restrictive orifices 364 of the inner sheet 372 with corresponding triangular plates 414 to increase heat transfer to the internalized suction air flow from the triangular plates 414.

The divider wall 416 (herein after referred to as a "de-icing conduit 416") may extend laterally from the fluid conduit 390c to the foraminous portion 350 to provide heat transfer to the foraminous portion 350. The de-icing conduit 416 may be fluidly connected to the fluid conduit 390c and the fluid conduit may be selectively opened and closed by a de-icing valve 396. The de-icing valve 396 may selectively direct fluid flow of fluid that has been heated, e.g., as described above and/or that is a de-icing fluid, through the de-icing conduit 416 to the foraminous portion 350 to prevent icing or to de-ice the foraminous portion 350. The fluid flow may be coolant fluid, e.g., used to cool the heat source or may be a separate de-icing fluid.

Integrating the de-icing conduit 416 with the first heat exchange system 336a allows a reduction of complexity compared to traditional de-icing systems. A de-icing fluid may be the same fluid flowing through the conduits for the heat transfer system. Different fluid may be used. For example, to prepare for de-icing, the conduits could be purged of heat transfer fluid and filled by the de-icing fluid if de-icing. Thus, each conduit may serve multiple purposes and may provide space and weight savings while providing the functionality of separate conduits carrying different fluids. In an embodiment, multiple de-icing conduits are provided and integrated with the first heat exchange system.

The cascading sheets 418 may form a maze of fluid pathways for the internal air to follow. The fluid pathways formed by the cascading sheets 418 allow a greater thermally conductive surface area from which the internal air flow may absorb heat.

The cascading sheets 418 may include a plurality of openings 420 that are longitudinally offset and laterally offset from one another. For example, the cascading sheets 418 may include a first lateral layer with openings spaced longitudinally apart. The cascading sheets 418 may also include a second laterally spaced layer with openings longitudinally spaced apart from the openings of the first layer. The longitudinal spacing may guide the internal air flow longitudinally along the second laterally spaced layer. The cascading sheets 418 may further include a third laterally spaced layer with openings longitudinally spaced apart from the openings of the second layer. The longitudinal spacing may guide the internal air flow longitudinally along the third laterally spaced layer. Depending on the acceptable pressure drop experienced by the internalized suction air flow, the number of layers may vary. Also, the openings 420 might constitute small orifices in which case the cascading sheet configuration results in a cascade of impinging air jets providing for increased heat transfer from the cascading sheet to the internalized suction air flow.

The second heat exchange system 336*b* may be any suitable system for transferring heat, such as a surface skin heat exchanger. For example, the second heat exchange system 336*b* may include a thermally conductive panel 426 and thermally conductive fluid conduits 428, 430 fluidly connected to the thermally conductive conduits 390*a*-390*e* of the first heat exchange system 336*a*. The fluid from the first heat exchange system 336*a* may flow to the thermally conductive fluid conduits 428, 430 of the second heat exchange system 336*b* to transfer heat from the fluid to the foraminous portion 350 prior to returning the fluid to the heat source via a return conduit. The fluid may be a coolant fluid, e.g., a fluid material used to cool an engine, motor or the like, or may be another fluid material. For this example, the fluid is referred to as a coolant fluid, but may be another suitable fluid to carry out the described functions. In an embodiment, the fluid conduits of the second heat exchange system at least partially receive coolant fluid from a source other than the first heat exchange system. For example, the conduits of the second heat exchange system may receive coolant fluid from another heat source to transfer heat from the other heat source to the conduits of the second heat exchange system.

During use of the aircraft 320, coolant fluid may absorb heat from the heat source and flow through the fluid conduits 390*a*-390*e*, 392, 410*c*-410*a* to transfer the absorbed heat to the fluid conduits 390*a*-390*e*, 392, 410*c*-410*a*. As the fluid conduits 390*a*-390*e*, 392, 410*c*-410*a* absorb the heat, the thermally conductive panel 378 and the divider walls 394*a*-394*c*, 416 may absorb heat from the fluid conduits 390*a*-390*e*, 392. A portion of the coolant fluid may be directed to the fluid conduit 392 adjacent the foraminous portion 350 to transfer heat from the coolant fluid to the foraminous portion 350 via the fluid conduit 392. Another portion of the coolant fluid may be directed to the fluid conduits 410*a*-410*c* connected to the triangular plates 414 to transfer heat from the coolant fluid to the triangular plates 414 via the fluid conduits 410*a*-410*c*.

When the valve 396*a* directs a portion of the fluid to the de-icing conduit 416, the fluid flows to the foraminous portion 350. The fluid may transfer heat to the foraminous portion 350 and the fluid may flow out of the foraminous portion 350 to de-ice or prevent icing of the foraminous portion 350. The fluid flowing out of the foraminous portion 350 may be the coolant fluid or a de-icing fluid from a separate fluid system.

A valve 396*b* may direct a portion of the fluid through the divider wall 394*a* to discharge the portion of the fluid (e.g., ethylene glycol) onto the surface of the foraminous portion 350 to prevent icing or debris build on the foraminous portion 350. Similarly, a valve 396*c* may direct a portion of the fluid through the divider wall 394*c* to discharge the portion of the fluid onto the surface of the foraminous portion 350 to prevent icing or debris build on the foraminous portion 350.

The coolant fluid may flow through the conduits 428, 430 of the second heat exchange system 336*b* to increase heat transfer from the coolant fluid by transferring additional heat to the foraminous portion 350 via the fluid conduits 430 adjacent the foraminous portion 350. The heat transfer from the second heat exchange system 336*b* may warm the corresponding foraminous portion 350 to de-ice or prevent icing of the foraminous portion 350 or to enhance laminar flow characteristics of the outer airflow by heating the adjacent aircraft skin. Transferring heat via the second heat exchange system 336*b* to the foraminous portion 350 or non-foraminous portions of the aircraft skin may allow increased rates of heat transfer from the coolant fluid compared to the first heat exchange system 336*a* alone. The greater rates of heat transfer allow a greater reduction of heat in the returning coolant fluid.

As the coolant fluid flows through the fluid conduits 390*a*-390*e*, 392, 410*a*-410*c*, 416, 428, 430 and cools, the coolant fluid may flow through a return line (not shown) back to the corresponding heat source 334*a* to re-absorb heat from the heat source 334*a*.

The internalized suction air may flow through the foraminous portion 350 to absorb heat from the thermally conductive surfaces of the plates 412, the fluid conduits 390*a*-390*e*, 392, 410*a*-410*c*, the divider walls 394*a*-394*c*, 416, the triangular plates 414, and the cascading sheets 418. The internal air may flow through each restrictive orifice 364 to form a plurality of air jets impinging onto the thermally conductive surfaces of the thermally conductive triangular plates 414 to absorb heat from the thermally conductive triangular plates 414 and to facilitate further heat transfer from the fluid conduits 390*c*, 390*d*, 410*a*-410*c*. The internal air may also flow through each opening in the cascading sheets 418 to move longitudinally back and forth along the cascading sheets 418 to allow further heat transfer from the fluid conduits 390*b*, 390*c* and the thermally conductive panel 378.

The internalized suction air flow of each portion of the first heat exchange system 336*a* may exhaust through an opening (not shown) vertically spaced from the illustrated cross section, or any other suitable opening.

The prescribed configurations of the heat transfer system 336*a* are examples of possible implementation of an integrated heat transfer system which may utilize suction air flowing into the aircraft as a heat transfer medium on a cold side to absorb heat generated within the aircraft. At the same time, and as discussed further below, the integrated heat transfer system may provide structural support to the aircraft structure where the heat exchange system is implemented.

Figure 5:
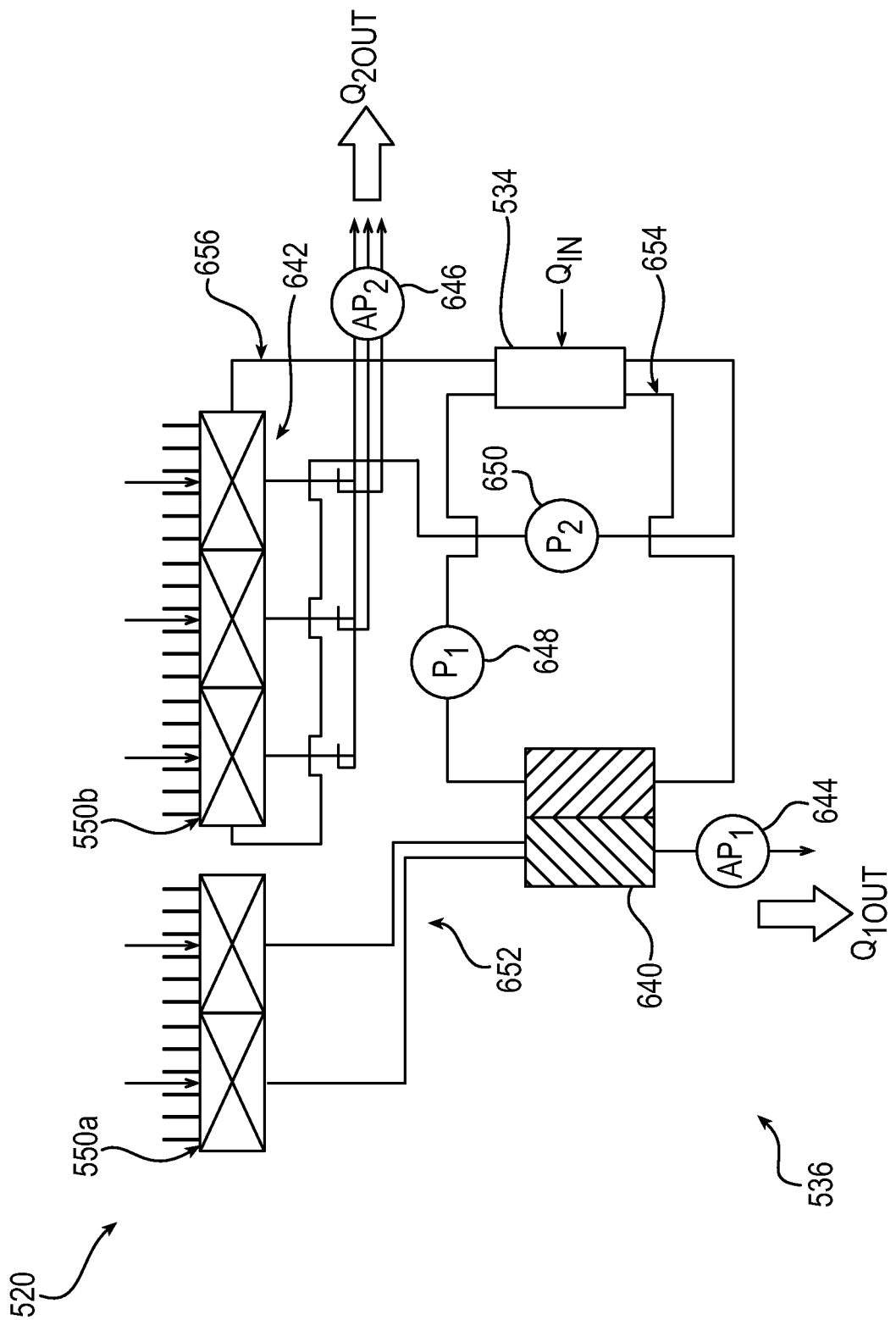
FIG. 5 is a schematic representation of two configurations of foraminous portions and corresponding heat exchangers.

Turning now to FIG. 5, a portion of an aircraft is shown at 520. The aircraft 520 is substantially the same as the above-referenced aircraft 20, 120, 220, 320, and consequently the same reference numerals but indexed by 500 are used to denote structures corresponding to similar structures in the aircraft. In addition, the foregoing descriptions of the aircraft 20, 120, 220, 320 are equally applicable to the aircraft 520 except as noted below. Moreover, it will be appreciated that aspects of the aircraft may be substituted for one another or used in conjunction with one another where applicable.

The aircraft 520 may include a heat exchange system 536 including a first heat exchanger 640 not integrated with a first set of foraminous portions 550*a*. The heat exchange system 536 may also include a second heat exchanger 642 integrated with a second set of foraminous portions 550b. The heat exchange system may further include a first air pump 644, a second air pump 646, a first fluid pump 648, a second fluid pump 650, and a heat source 534.

The first heat exchanger 640 may be configured to receive cool internalized suction air from the first set of foraminous portions 550a via air flow lines 652, e.g., an open fluid system. The first air pump 644 may be fluidly connected with the first heat exchanger 640 and the first set of foraminous portions 550a to suction air through the first set of foraminous portions 550a. The first fluid pump 648 may be fluidly connected with the first heat exchanger 640 to provide a warm fluid from the heat source 534 via a first fluid circuit 654, e.g., a closed fluid system. The first set of foraminous portions 550a may be any of the above described foraminous portions or any other suitable foraminous portion to allow a cooling air flow to absorb heat from the warm fluid in the first fluid circuit 654 via the first heat exchanger 640.

The second heat exchanger 642 may be configured to receive cool internalized suction air from the second set of foraminous portions 550b via the second air pump 646 fluidly connected with the second heat exchanger 642 and the second set of foraminous portions 550b via air flow lines, e.g., an open fluid system. The second fluid pump 650 may be fluidly connected with the second heat exchanger 642 to provide a warm fluid from the heat source 534 via a second fluid circuit 656, e.g., a closed fluid system. The second set of foraminous portions 550b and the second heat exchanger 642 may be any of the above described foraminous portions and heat exchangers or any other suitable foraminous portion 550b and heat exchanger 642.

During use of the aircraft 520, the first air pump 644 pulls in air from the first set of foraminous portions 550a to absorb heat from the warm fluid provided by the first fluid pump 648 to the first heat exchanger 640. The first fluid pump 648 may pump the warm fluid from the heat source 534. The first air pump 644 may suction the air at a fixed rate or at a variable rate. The portion of the heat absorbed by the fluid controlled by the first fluid pump 648 and transferred to the air (controlled by the first air pump 644) from the fluid controlled by the first fluid pump 648 is represented by $Q_{1OUT}$.

The second air pump 646 pulls in air from the second set of foraminous portions 550b to absorb heat from the warm fluid provided by the second fluid pump 650 to the second heat exchanger 642 from the heat source 534. The second air pump 646 may suction the air at a variable rate that is adjusted based on the rate of heat output from the heat source 534. The portion of the heat absorbed by the fluid controlled by the second fluid pump 650 and transferred to the air (e.g., controlled by the second air pump 646) from the fluid controlled by the second fluid pump 650 is represented by $Q_{2OUT}$.

Figure 6:
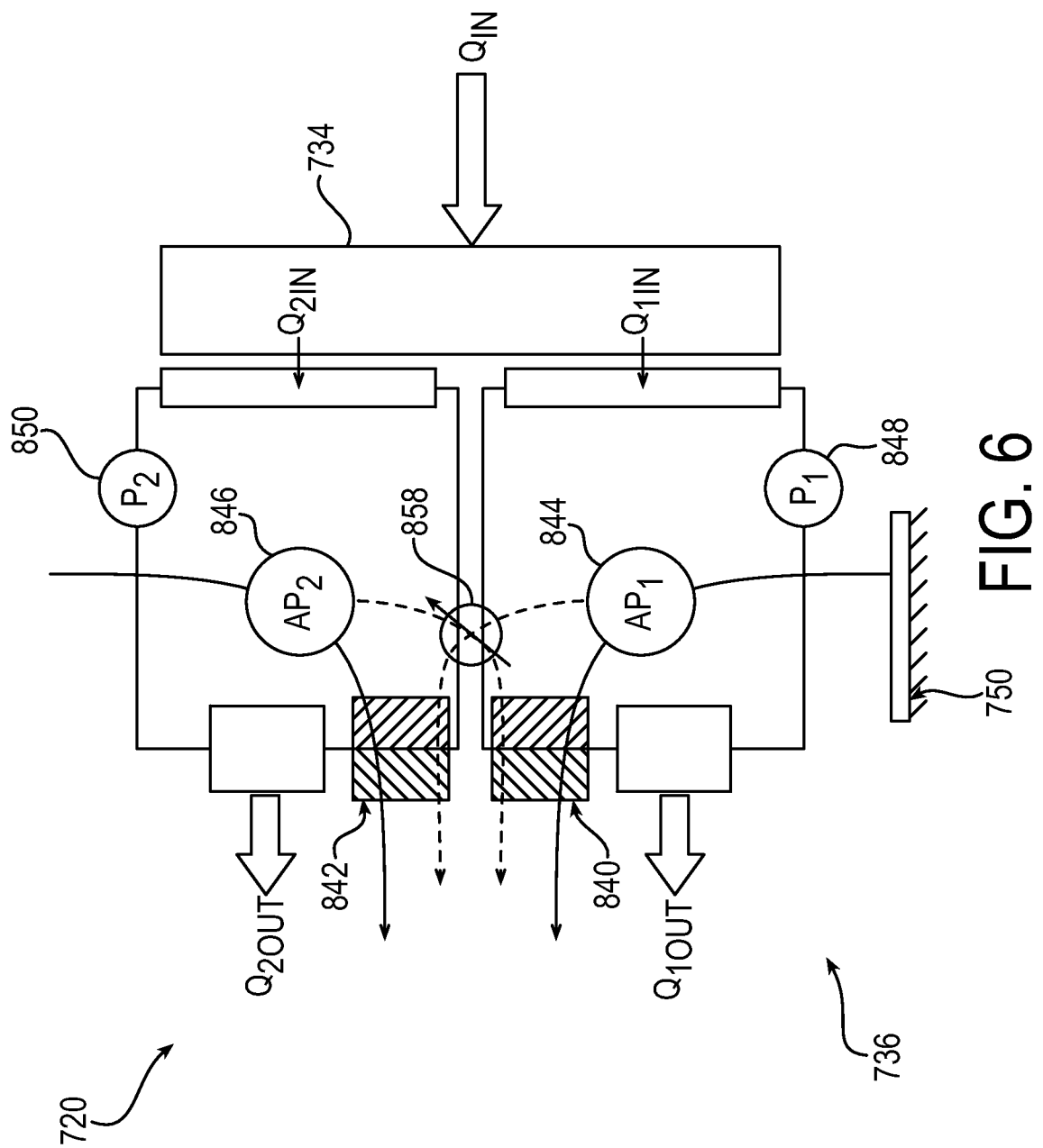
FIG. 6 is a schematic representation of an exemplary heat exchanger and foraminous portion in combination with another heat exchanger.

Turning now to FIG. 6, a portion of an aircraft is shown at 720. The aircraft 720 is substantially the same as the above-referenced aircraft 20, 120, 220, 320, 520, and consequently the same reference numerals but indexed by 700 are used to denote structures corresponding to similar structures in the aircraft. In addition, the foregoing descriptions of the aircraft 20, 120, 220, 320, 520 are equally applicable to the aircraft 720 except as noted below. Moreover, it will be appreciated that aspects of the aircraft may be substituted for one another or used in conjunction with one another where applicable.

The aircraft 720 may include a heat exchange system 736 including a first heat exchanger 840 that is not integrated with a first foraminous portion 750, a second heat exchanger 842, a first air pump 844, a second air pump 846, a first fluid pump 848, a second fluid pump 850, a heat source 734, and a controller 858.

The first heat exchanger 840 may be configured to receive cool internalized suction air from the first foraminous portion 750. The first air pump 844 may induce air flow through the first foraminous portion 750 to transfer heat from the first heat exchanger 840 to the air flow. The first heat exchanger 840 may be configured to receive warm fluid from the heat source 734 via the first fluid pump 848.

The second heat exchanger 842 may be any suitable heat exchanger. For example, the second heat exchanger 842 may be configured to receive cool air via the second air pump 846 and configured to receive warm fluid from the heat source 734 via the second fluid pump 850. Alternatively, the second heat exchanger 842 may receive another coolant fluid from another source and the second air pump 846 may be a fluid pump capable of pumping liquids to the second heat exchanger 842.

The controller 858 may direct air flow from the first air pump 844 to the second heat exchanger 842 or from the second air pump 846 to the first heat exchanger 840. The controller 858 may direct the air flow based on the heat output of the heat source 734, based on the heat transferred to each of the heat exchangers 840, 842 from the heat source 734, and/or based on the air suction mass flow rate from the foraminous portion 750.

During use of the aircraft 720, the first air pump 844 pulls in the cool air from the first set of foraminous portions 750 to maintain laminar flow in the adjacent exterior air flow and to absorb heat from the fluid provided by the first fluid pump 848 to the first heat exchanger 840. The heat transferred from the heat source to the fluid controlled by the first fluid pump 848 is represented by $Q_{1IN}$. The heat transferred from the fluid controlled by the first fluid pump 848 to the air flow controlled by the first air pump 844 and/or the second air pump 846 is represented by $Q_{1OUT}$.

The second air pump 846 pulls in cool air to absorb heat from the fluid provided by the second fluid pump 850 to the second heat exchanger 842. The heat transferred from the heat source 734 to the fluid controlled by the second fluid pump 850 is represented by $Q_{2IN}$. The heat transferred from the fluid controlled by the second fluid pump 850 to the air flow controlled by the second air pump 846 and/or the first air pump 844 is represented by $Q_{2OUT}$.

Figure 7B:
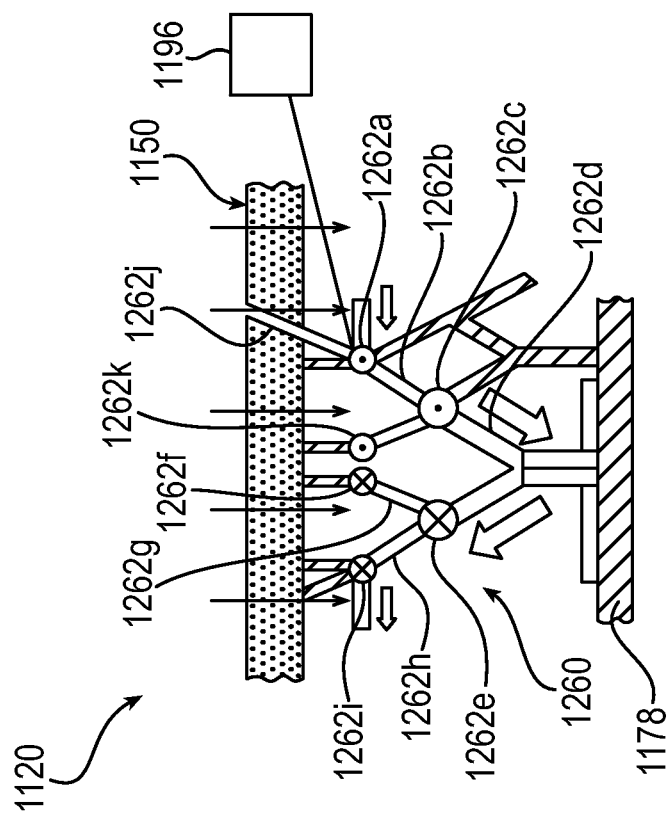
FIG. 7B is a cross-section view of another exemplary structural support forming a portion of an exemplary heat exchanger.
Figure 7A:
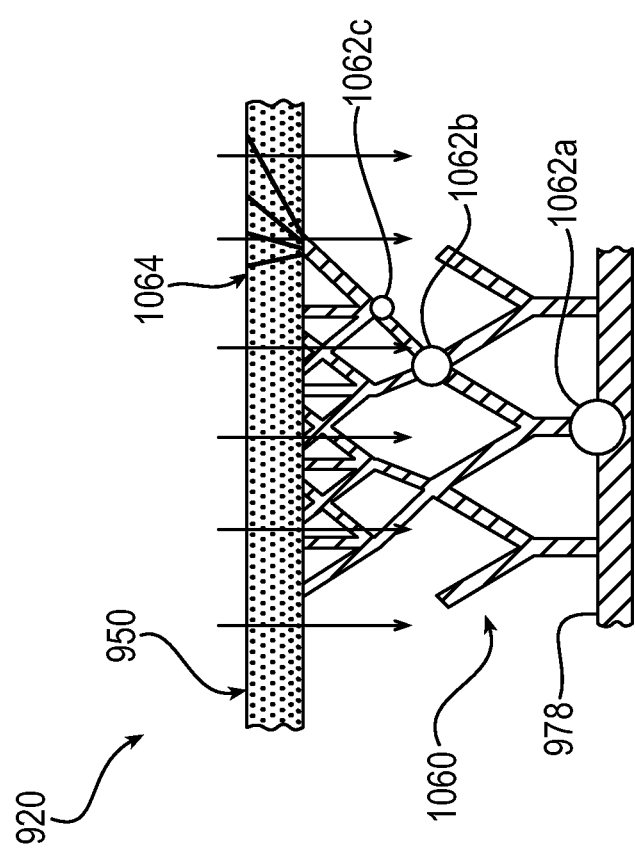
FIG. 7A is a cross-section view of an exemplary structural support forming a portion of an exemplary heat exchanger.

The controller 858 varies the flow split of air from each corresponding air pump 844, 846 to the heat exchangers 840, 842 based on the current system requirements and/or minimizing system energy expenditures. If $Q_{1IN}$ is higher than $Q_{2IN}$ the controller 858 may direct cool air flow from the second air pump 846 to the first heat exchanger 840 to increase $Q_{1OUT}$, particularly if the internalized suction air mass flow from the first air pump 844 is set by laminar-flow system requirements. Alternatively, if $Q_{2IN}$ is higher than $Q_{1IN}$ the controller 858 may direct cool air flow from the first air pump 844 to the second heat exchanger 842 to increase $Q_{2OUT}$, and as laminar-flow system requirements allow Turning now to FIGS. 7A and 7B, a portion of an aircraft is shown at 920 and 1120. The aircraft 920 and 1120 are substantially the same as the above-referenced aircraft 20, 120, 220, 320, 720, 920, and consequently the same reference numerals but indexed by 900 and 1100 are used to denote structures corresponding to similar structures in the aircraft. In addition, the foregoing descriptions of the aircraft 20, 120, 220, 320, 520, 720 are equally applicable to the aircraft 920 and 1120 except as noted below. Moreover, it will be appreciated that aspects of the aircraft may be substituted for one another or used in conjunction with one another where applicable.

The aircraft 920 may include a foraminous portion 950, a thermally conductive branching support structure 1060, and a thermally conductive panel 978 connected to the thermally conductive branching support structure 1060. The thermally conductive branching support structure 1060 may be a load bearing structure for the foraminous portion 950 and may include a plurality of fluid conduits 1062a-1062c to transfer heat from a heat source (an exemplary heat source is illustrated in FIG. 1A) to suction air flowing through the foraminous portion. The thermally conductive branching support structure 1060 may have branches extending from the thermally conductive panel 978 to the foraminous portion 950. For example, the branches may form a venation pattern. The branches may be constructed based on computational multi-goal optimization techniques considering heat transfer characteristics, suction flow pressure drop and structural strength.

The branches may be thermally connected to the fluid conduits 1062a-1062c to transfer heat from the fluid conduits 1062a-1062c to the branches. The thermally conductive branching support structure 1060 may also include a plurality of thermally conductive de-icing branches 1064 extending through the foraminous portion 950. The de-icing branches 1064 may transfer heat from a thermally connected branch to the foraminous portion 950. Transferring heat to the de-icing branches 1064 allows heating of the foraminous portion 950 to prevent icing or to de-ice the foraminous portion.

During use of the aircraft 920, the thermally conductive branching support structure 1060 synergistically supports the foraminous portion 950 and—in conjunction with other aircraft structural elements—transfers heat from the heat source (FIG. 1A) via the branches and the fluid conduits 1062a-1062c. The heat source may transfer heat to a fluid carried by the fluid conduits 1062a-1062c. The fluid flows through the fluid conduits 1062a-1062c and transfers heat to the fluid conduits 1062a-1062c. The heat from the fluid conduits 1062a-1062c may transfer to air flowing through the foraminous portion 950 directly and/or via the thermally conductive branching support structure 1060 and the thermally conductive panel 978.

The de-icing branches 1064 absorb heat from some of the other branches to transfer heat to the foraminous portion 950.

The thermally conductive branching support structure may be manufactured by 3D printing and/or additive manufacturing.

The aircraft 1120, is substantially the same as the aircraft 920, and may include a foraminous portion 1150, a thermally conductive branching support structure 1260, and a thermally conductive panel 1178 connected to the thermally conductive branching support structure 1260. The thermally conductive branching support structure 1260 may be a load bearing structure for the foraminous portion 1150 and other aircraft structural elements and may include a plurality of fluid conduits 1262a-1262j to transfer heat from a heat source (an exemplary heat source is illustrated in FIG. 1A) to suction air flowing through the foraminous portion 1050. The thermally conductive branching support structure 1260 may extend from the thermally conductive panel 1178 to the foraminous portion 1150 and include a plurality of branches thermally connected to the fluid conduits.

Some of the branches may be hollow to form the fluid conduits 1262b, 1262d, 1262g-1262k for carrying the coolant fluid, while remaining load bearing supports of the thermally conductive branching support structure 1260. Carrying the fluid may enhance heat transfer from the heat source to the branches, and, thus, may enhance heat transfer from the branches to the internalized suction air flow. A hollow branch forming the fluid conduit 1262j (herein after referred to as a "de-icing conduit 1262j") may extend through the foraminous portion 1150 to allow heat and/or fluid to transfer from the de-icing conduit to the foraminous portion 1150. In an embodiment, some of the hollow branches may form independent fluid lines to carry other fluids for other purposes. For example, some of the hollow branches may form a fuel line, a hydraulic line, a dedicated de-icing line, and/or a nitrogen enriched air inerting gas line.

During use of the aircraft 1120, the thermally conductive branching support structure 1260 synergistically supports the foraminous portion 1150 and other aircraft structural elements while the thermally conductive branching support structure 1260 transfers heat from the heat source via the thermally conductive branches, the fluid conduits 1262a-1262k, and the fluid carried in the fluid conduits 1262a-1262k. The heat source may transfer heat to the coolant fluid carried by the fluid conduits 1262a-1262k and the fluid conduits 1262a-1262k may transfer the heat to the internalized suction air directly, via the thermally conductive branches of the thermally conductive branching support structure 1260, and/or via a thermally conductive panel 1178 connected to an opposite end of the thermally conductive branching support structure 1260 relative to the foraminous portion 1150.

The coolant fluid may flow in a direction parallel to the foraminous portion 1150 through some of the fluid conduits 1262a, 1262c, 1262k, e.g., the conduits marked with a dot at their center. The coolant fluid may flow in an opposite direction in other fluid conduits 1262e, 1262f, 1262i, e.g., the conduits marked with an "X" at their center.

The de-icing conduit 1262j provides heated fluid, or another fluid, to the foraminous portion 1150 to prevent icing of the foraminous portion. Flow of coolant fluid/de-icing fluid is controlled through the de-icing conduit 1262j, which may be controlled by valve 1196.

The thermally conductive branching support structure may be manufactured by 3D printing and/or additive manufacturing.

Turning now to FIG. 8, a portion of an aircraft is shown at 1320. The aircraft 1320 is substantially the same as the above-referenced aircraft 20, 120, 220, 320, 520, 720, 920, 1120, and consequently the same reference numerals but indexed by 1300 are used to denote structures corresponding to similar structures in the aircraft. In addition, the foregoing descriptions of the aircraft 20, 120, 220, 320, 520, 720, 920, 1120 are equally applicable to the aircraft 1320 except as noted below. Moreover, it will be appreciated that aspects of the aircraft may be substituted for one another or used in conjunction with one another where applicable.

The aircraft 1320 may include a wing 1324 with a foraminous portion (not shown) at the leading edge 1470, a thermally conductive support structure 1460, and thermally conductive fluid conduits 1462a-1462c thermally connected to a heat source 1334.

The thermally conductive support structure 1460 may form a spar 1472, perforated ribs 1474, and/or stringers 1476 of the wing 1324. The thermally conductive support structure 1460 may include additional sub-scale surfaces (also referred to as "substructures") contributing to structural support and enhancing heat transfer to the internalized suction flow (not shown in FIG. 8). For example, the thermally conductive support structure 1460 may be at least partially formed by a thermally conductive material with a minimum conductivity of 20 W/(m*K).

The thermally conductive support structure may have a minimum conductivity of 100 W/(m*K). The thermally conductive support structure may have a minimum conductivity of 150 W/(m*K). For example, the thermally conductive support structure may be made of an aluminum material, such as aluminum, aluminum alloys, or any combination thereof.

Other parts of the thermally conductive support structure 1460 may have a significantly higher thermal conductivity of its material, e.g., 400 W/(m*K). For example, the thermally conductive support structure or parts of it may be produced by macrolaminate or additive manufacturing technology and be made of an composite material, aluminum material, such as aluminum, aluminum alloys, nickel alloy, titanium, titanium alloy, copper, graphite foam, or any combination thereof. Material selection may depend on the desired heat transfer characteristics, may depend on the structural support provided by the thermally conductive support structure 1460, and may depend on pressure losses incurred by the internalized suction air flow passing through the thermally conductive support structure 1460.

In a further embodiment, the thermally conductive support structure is a unitary structure including fluid conduits for fluid flow.

The thermally conductive support structure 1460 may be manufactured by 3D printing and/or additive manufacturing.

The thermally conductive fluid conduits 1462a-1462c may be thermally connected to the heat source 1334 via fluid flow through the fluid conduits 1462a-1462c. The fluid flow allows heat transfer from the heat source 1334 to the thermally conductive support structure through the fluid conduits 1462a-1462c. The heat may be transferred from the thermally conductive support structure 1460—and substructures (not shown in FIG. 8)—to suction air flowing through the foraminous portion at the leading edge 1470.

During use of the aircraft 1320, a fluid may flow through the fluid conduits 1462a-1462c to absorb heat from the heat source 1334 and to transfer heat through the thermally conductive support structure 1460—and substructures (not shown in FIG. 8)—while the thermally conductive support structure 1460 and/or substructures (not shown in FIG. 8) support the wing 1324 against loads applied to the wing 1324.

Turning now to FIGS. 9A and 9B, a portion of an aircraft is shown at 1520. The aircraft 1520 is substantially the same as the above-referenced aircraft 20, 120, 220, 320, 520, 720, 920, 1120, 1320, and consequently the same reference numerals but indexed by 900 are used to denote structures corresponding to similar structures in the aircraft. In addition, the foregoing descriptions of the aircraft 20, 120, 220, 320, 520, 720, 920, 1120, 1320 are equally applicable to the aircraft 1520 except as noted below. Moreover, it will be appreciated that aspects of the aircraft may be substituted for one another or used in conjunction with one another where applicable.

The aircraft 1520 may include a wing 1524 having a thermally conductive support structure 1660 of varying density (i.e., a ratio of volume occupied by structural material and air volume) based on the location of the wing where the thermally conductive support structure 1660 is located. Portions of the thermally conductive support structure 1160 provide structural support, heat transfer from a heat source to air flow being suctioned from a foraminous portion, and/or fluid distribution to an external surface for de-icing.

The density of the thermally conductive support structure 1660 is represented schematically by variously sized boxes. Larger boxes correspond to a lower density (i.e., less structural material per in$^3$ of volume) and smaller boxes correspond to a higher density.

The thermally conductive support structure 1660 may have a low density at a first lateral end that would be adjacent a fuselage (FIG. 1A and FIG. 1B) of the aircraft 1520. The density of the thermally conductive support structure 1660 may increase toward a central portion of the wing 1524 and toward a longitudinally rearward portion of the wing 1524. A higher density thermally conductive support structure 1660 may allow a strength increase and weight reduction compared to a lower density thermally conductive support structure 1600.

The spatial density and scale of the thermally conductive support structure 1660 may vary based on different aircraft wings and aircraft purposes. Depending on the target optimization, the density and scale may vary by orders of magnitude. For example, optimization of a leading edge 1680 for a laminar flow control surface and a heat exchange/de-icing function versus an optimization of the entire wing 1524 for aerodynamic and other loads considering multiple extensive laminar flow control surfaces on the wing 1524. The shape of the thermally conductive support structure 1660 may be based on the largest structural components or fluid conduits. For example part of the thermally conductive support structure 1660 may be based on a shape and size of a wing spar (shown in FIG. 8) of the wing 1524. Another part of the thermally conductive support structure 1660 may also be based on a suction line fluidly connected to a pump for suctioning air flow through a foraminous portion.

A first aspect of the invention is a heat exchange system for a vehicle. In an exemplary embodiment, the heat exchange system includes a vehicle panel for forming an outer surface of the vehicle, a laminar flow control surface forming at least a portion of an exterior surface of the vehicle panel, at least a portion of the laminar flow control surface being foraminous to permit a first portion of an external fluid to flow therethrough and to enhance laminar flow characteristics of a second portion of the external fluid that flows over the exterior surface of the vehicle panel, and a heat exchanger in fluid communication with the foraminous portion to receive the first portion of the external fluid that flows interiorly through the foraminous portion and to provide heat transfer from the heat exchanger to the first portion of the external fluid.

In an exemplary embodiment, the heat exchange system may further include one or more restrictive orifices between the foraminous portion and the heat exchanger, the one or more restrictive orifices being configured to form the first portion of the external fluid traveling therethrough into a respective stream of fluid impinging against the heat exchanger.

In an exemplary embodiment, the heat exchange system may further include one or more restrictive orifices between the foraminous portion and the heat exchanger, the number and size of the restrictive orifices being based on a desired mass flow rate of the first portion of the external fluid, preferably the desired mass flow rate is based on the amount of heat transfer from the heat exchanger to the first portion of the external fluid and/or based on the Reynolds number of the second portion of the external fluid flowing over the exterior surface.

In an exemplary embodiment, the heat exchange system may further include one or more restrictive orifices between the foraminous portion and the heat exchanger, each restrictive orifice being a distance from a thermally conductive surface of the heat exchanger based on a mass flow rate of the first portion of the external fluid flowing through each orifice and/or based on a size of each orifice.

In an exemplary embodiment, the heat exchanger may include one or more thermally conductive fluid conduits configured to transfer heat from a heat source to at least part of the first portion of the external fluid flow through the foraminous portion.

In an exemplary embodiment, the thermally conductive fluid conduits may be configured to carry a second fluid to transfer heat to the at least part of the first portion of the external fluid flowing through the foraminous portion.

In an exemplary embodiment, the heat exchange system may further include one or more heat sources thermally connected to the heat exchanger. At least one of the heat sources may include a fuel cell.

In an exemplary embodiment, the heat exchange system may further include one or more thermally conductive dividers extending from a portion of the heat exchanger to the foraminous portion of the laminar flow control surface to guide at least part of the first portion of the external fluid, and/or to control spatial mass flow distribution, of the first portion of the external fluid, along the foraminous portion of the surface.

In an exemplary embodiment, the heat exchange system may further include one or more de-icing conduits for transferring heat from the heat exchanger to the foraminous portion.

In an exemplary embodiment, the heat exchange system may further include one or more de-icing conduits for transferring a second fluid from the heat exchanger to the exterior surface.

In an exemplary embodiment, the heat exchanger may include a thermally conductive structural support that is configured to resist changing of a shape of the exterior surface of the vehicle panel or another vehicle component, wherein the structural support is configured to receive at least part of the first portion of the external fluid that has flowed through the foraminous portion to provide heat transfer from the conductive structural support to at least part of the first portion of the external fluid.

In an exemplary embodiment, the thermally conductive structural support may include one or more of a spar of an aircraft, a rib of an aircraft, and/or a stringer of an aircraft. The thermally conductive structural support may include one or more fluid conduits to transfer heat from a heat source to the at least part of the first portion of the external fluid that has flowed through the foraminous portion.

In an exemplary embodiment, the heat exchange system may further include a pump configured to suction at least part of the first portion of the external fluid through the foraminous portion. The heat exchange system may further include a controller to selectively operate the pump to suction the at least part of the first portion of the external fluid through the foraminous portion.

In an exemplary embodiment, the heat exchange system may further include one or more exhaust channels configured to exhaust at least part of the first portion of the external fluid that has flowed through the foraminous portion and absorbed heat from the thermally conductive device. At least one of the exhaust channels may flow to a cabin of the vehicle to adjust a temperature within the cabin, and/or at least one of the exhaust channels flows to a downstream end of an aircraft engine nacelle's bypass nozzle.

In an exemplary embodiment, the heat exchanger may further include a thermally conductive surface at least partially formed by a thermally conductive panel, wherein the thermally conductive surface is configured to receive at least part of the first portion of the external fluid. The heat exchanger may further include a plurality of thermally conductive parallel plates thermally connected to the thermally conductive panel, the thermally conductive parallel plates being configured to transfer heat to at least part of the first portion of the external fluid flowing through the foraminous portion to the thermally conductive parallel plates.

In an exemplary embodiment, the heat exchanger may further include a plurality of thermally conductive geometrically shaped plates, preferably triangular plates, configured to transfer heat to at least part of the first portion of the external fluid flowing through the foraminous portion to the thermally conductive geometrically shaped plates. The heat exchanger may further include one or more restrictive orifices configured to form the at least part of the first portion of the external fluid traveling therethrough into a stream of fluid impinging against one or more of the thermally conductive geometrically shaped plates.

In an exemplary embodiment, the heat exchanger may further include thermally conductive cascading sheets configured to form a cascade of impinging jets to transfer heat to at least part of the first portion of the external fluid flowing through the foraminous portion to the thermally conductive cascading sheets.

In an exemplary embodiment, the foraminous portion may form at least part of a leading edge of a vehicle and/or a downstream surface of a vehicle.

In an exemplary embodiment, the foraminous portion may form at least part of a leading edge of an aircraft and/or a corresponding downstream surface of an aircraft.

In an exemplary embodiment, the foraminous portion may form at least part of a leading edge of a tail of an aircraft, a wing of an aircraft, and/or a nacelle of an aircraft.

In an exemplary embodiment, the foraminous portion may include a microporous portion, a plurality of laser drilled holes, and/or a porous portion.

In an exemplary embodiment, the heat exchange system may further include a second heat exchanger having one or more fluid conduits configured to receive fluid from a closed fluid system of the heat exchanger to transfer heat to the foraminous portion.

In an exemplary embodiment, the heat exchange system may further include a second heat exchanger configured to receive air through a second laminar flow control surface having a foraminous portion of a second vehicle panel forming the outer surface of the vehicle, the foraminous portion being configured to permit fluid flow therethrough and to provide laminar flow characteristics to external fluid that flows over the second laminar flow control surface, the second heat exchanger being configured to receive fluid from a closed fluid system of the heat exchange system to transfer heat to the fluid permitted to flow through the foraminous portion.

In an exemplary embodiment, the heat exchanger may be a first heat exchanger, and may further include a second heat exchanger configured to receive a cooling fluid, a controller configured to selectively direct the cooling fluid to the first heat exchanger to increase a rate of heat transfer from the first heat exchanger, and the controller being configured to selectively direct fluid flowing through the foraminous portion to the second heat exchanger to increase a rate of heat transfer from the second heat exchanger.

Another aspect of the invention is a method of reducing drag of a vehicle and removing heat from the vehicle. In an exemplary embodiment the method includes receiving fluid flowing through a foraminous portion of a body configured to permit fluid flow therethrough, and configured to provide laminar flow characteristics to an external fluid that flows over the foraminous portion, transferring heat from a heat source to a heat exchanger, and directing the fluid flowing through the foraminous portion against the heat exchanger to transfer heat from the heat exchanger to the fluid flowing through the foraminous portion.

Another aspect of the invention is a heat exchange system for transferring thermal energy created by a portion of an aircraft. In an exemplary embodiment, the heat exchange system includes a panel forming an outer surface of the aircraft, a laminar flow control surface forming at least a portion of an exterior surface of the panel, the laminar flow control surface having a foraminous portion to permit a portion of air flowing over the panel during flight to flow through the foraminous portion and into an interior cavity in fluid communication with the foraminous portion, and a heat exchanger for providing thermal energy, whereby the interior cavity permits a portion of the air flowing through the foraminous portion to absorb thermal energy from the heat exchanger, preferably the thermal energy absorbed by the portion of the air flowing through the foraminous portion is expelled to an exterior portion of the aircraft, wherein the portion of the air flowing through the foraminous portion reduces turbulence of air flowing over the laminar flow control surface during flight of the aircraft.

Another aspect of the invention is an aircraft. In an exemplary embodiment, the aircraft includes a heat exchange system for transferring heat provided by a portion of the aircraft. In an exemplary embodiment, the heat exchange system includes a panel for forming an outer surface of the aircraft, a laminar flow control surface forming at least a portion of an exterior surface of the panel, at least a portion of the laminar flow control surface being foraminous to permit a first portion of externally flowing air to flow therethrough and to enhance laminar flow characteristics of a second portion of the externally flowing air that flows over the exterior surface of the panel, a heat exchanger in fluid communication with the foraminous portion to receive the first portion of the externally flowing air that flows interiorly through the foraminous portion, and one or more restrictive orifices between the foraminous portion and a thermally conductive surface of the heat exchanger, the one or more restrictive orifices being configured to form the first portion of the externally flowing air traveling therethrough into a respective impinging stream of air against the thermally conductive surface to provide heat transfer from the heat exchanger to the first portion of the externally flowing air via the thermally conductive surface.

Another aspect of the invention is a wing of an aircraft, a tail of an aircraft, a nacelle of an aircraft or another portion, of an aircraft, impinged by air during flight. In an exemplary embodiment, the wing, tail, nacelle, or another portion includes a heat exchange system for transferring heat provided by a second portion of the aircraft. In an exemplary embodiment, the heat exchange system includes a panel for forming an outer surface of the respective wing, tail, nacelle or the another portion, a laminar flow control surface forming at least a portion of an exterior surface of the panel, at least a portion of the laminar flow control surface being foraminous to permit a first portion of externally flowing air to flow therethrough and to enhance laminar flow characteristics of a second portion of the externally flowing air that flows over the exterior surface of the panel, and a heat exchanger in fluid communication with the foraminous portion to receive the first portion of the externally flowing air that flows interiorly through the foraminous portion to provide heat transfer from the heat exchanger to the first portion of the externally flowing air, and one or more restrictive orifices between the foraminous portion and a thermally conductive surface of the heat exchanger, the one or more restrictive orifices being configured to form the first portion of the externally flowing air traveling therethrough into a respective impinging stream of air against the thermally conductive surface to provide heat transfer from the heat exchanger to the first portion of the externally flowing air via the thermally conductive surface.

Another aspect of the invention is a heat exchanger for a vehicle. In an exemplary embodiment, the heat exchanger includes a thermally conductive surface configured to provide thermal energy to a fluid flowing through a foraminous portion of a laminar flow control surface to impinge the thermally conductive surface, preferably the fluid is air, a heat source for producing heat, preferably the heat source includes a fuel cell, an engine, a motor, an electronics panel, and/or a portion of a heat exchanger, and a thermal connection for thermally connecting the thermally conductive surface to a heat source, to provide the thermal energy from the heat source to the thermally conductive surface via the thermal connection, preferably the thermal connection includes a thermally conductive material with a thermal conductivity of 20 W/(m*K), more preferably a thermal conductivity of 150 W/(m*K), or the thermal connection includes a thermally conductive fluid configured to flow between the thermally conductive surface and the heat source.

Another aspect of the invention is a heat exchange system for transferring heat. In an exemplary embodiment, the heat exchange system includes a panel for forming an outer surface of an aircraft, a laminar flow control surface forming at least a portion of an exterior surface of the panel, the laminar flow control surface having a foraminous portion to permit a first portion of externally flowing air to flow therethrough and to enhance laminar flow characteristics of a second portion of the externally flowing air that flows over the exterior surface of the panel, and one or more de-icing conduits configured to transfer heat and/or de-icing fluid from a heat source and/or from a heat exchanger, the heat and/or de-icing fluid being transferred to the foraminous portion while the first portion of the externally flowing air flows interiorly through the foraminous portion to enhance laminar flow characteristics of the second portion.

Another aspect of the invention is a heat exchanger for a vehicle. In an exemplary embodiment, the heat exchanger includes an outer skin having a profile forming a shape, a thermally conductive structural support connected to an inner surface of the outer skin and configured to resist the shape from changing, and a heat source, the heat source being thermally coupled to the structural support to conduct heat from the heat source. The thermally conductive structure support may include one or more of a spar, a rib, and/or a stringer. The outer skin may include a laminar flow control surface having a foraminous portion to permit fluid to flow through the foraminous portion to absorb heat from the heat source via the thermally conductive structural support. The thermally conductive structural support may include one or more fluid conduits to transfer heat from the heat source.

A heat exchange system, heat exchanger, method, wing of an aircraft, tail of an aircraft, nacelle of an aircraft, or an aircraft of any of the above aspects may include any of the following features individually or in combination with one another.

In an exemplary embodiment, the heat exchange system or the heat exchanger may further include one or more restrictive orifices between the foraminous portion and the heat exchanger, the one or more restrictive orifices being configured to form the first portion of the external fluid traveling therethrough into a respective stream of fluid impinging against the heat exchanger.

In an exemplary embodiment, the heat exchange system or the heat exchanger may further include one or more restrictive orifices between the foraminous portion and the heat exchanger, the number and size of the restrictive orifices being based on a desired mass flow rate of the first portion of the external fluid, preferably the desired mass flow rate is based on the amount of heat transfer from the heat exchanger to the first portion of the external fluid and/or based on the Reynolds number of the second portion of the external fluid flowing over the exterior surface.

In an exemplary embodiment, the heat exchange system or the heat exchanger may further include one or more restrictive orifices between the foraminous portion and the heat exchanger, each restrictive orifice being a distance from a thermally conductive surface of the heat exchanger based on a mass flow rate of the first portion of the external fluid flowing through each orifice and/or based on a size of each orifice.

In an exemplary embodiment, the heat exchange system or the heat exchanger may further include one or more thermally conductive fluid conduits configured to transfer heat from a heat source to at least part of the first portion of the external fluid flow through the foraminous portion.

In an exemplary embodiment, the thermally conductive fluid conduits may be configured to carry a second fluid to transfer heat to the at least part of the first portion of the external fluid flowing through the foraminous portion.

In an exemplary embodiment, the heat exchange system or the heat exchanger may further include one or more heat sources thermally connected to the heat exchanger. At least one of the heat sources may include a fuel cell.

In an exemplary embodiment, the heat exchange system or the heat exchanger may further include one or more thermally conductive dividers extending from a portion of the heat exchanger to the foraminous portion of the laminar flow control surface to guide at least part of the first portion of the external fluid, and/or to control spatial mass flow distribution, of the first portion of the external fluid, along the foraminous portion of the surface.

In an exemplary embodiment, the heat exchange system or the heat exchanger may further include one or more de-icing conduits for transferring heat from the heat exchanger to the foraminous portion.

In an exemplary embodiment, the heat exchange system or the heat exchanger may further include one or more de-icing conduits for transferring a second fluid from the heat exchanger to the exterior surface.

In an exemplary embodiment, the heat exchange system or the heat exchanger may further include a thermally conductive structural support configured to resist changing of a shape of the exterior surface of the vehicle panel or another vehicle component, wherein the structural support is configured to receive at least part of the first portion of the external fluid that has flowed through the foraminous portion to provide heat transfer from the conductive structural support to at least part of the first portion of the external fluid.

In an exemplary embodiment, the thermally conductive structural support may include one or more of a spar of an aircraft, a rib of an aircraft, and/or a stringer of an aircraft. The thermally conductive structural support may include one or more fluid conduits to transfer heat from a heat source to the at least part of the first portion of the external fluid that has flowed through the foraminous portion.

In an exemplary embodiment, the heat exchange system or the heat exchanger may further include a pump configured to suction at least part of the first portion of the external fluid through the foraminous portion. The heat exchange system or the heat exchanger may further include a controller to selectively operate the pump to suction the at least part of the first portion of the external fluid through the foraminous portion.

In an exemplary embodiment, the heat exchange system or the heat exchanger may further include one or more exhaust channels configured to exhaust at least part of the first portion of the external fluid that has flowed through the foraminous portion and absorbed heat from the thermally conductive device. At least one of the exhaust channels may flow to a cabin of the vehicle to adjust a temperature within the cabin, and/or at least one of the exhaust channels flows to a downstream end of an aircraft engine nacelle's bypass nozzle.

In an exemplary embodiment, the heat exchange system or the heat exchanger may further include a thermally conductive surface at least partially formed by a thermally conductive panel, wherein the thermally conductive surface is configured to receive at least part of the first portion of the external fluid. The heat exchanger may further include a plurality of thermally conductive parallel plates thermally connected to the thermally conductive panel, the thermally conductive parallel plates being configured to transfer heat to at least part of the first portion of the external fluid flowing through the foraminous portion to the thermally conductive parallel plates.

In an exemplary embodiment, the heat exchange system or the heat exchanger may further include a plurality of thermally conductive geometrically shaped plates, preferably triangular plates, configured to transfer heat to at least part of the first portion of the external fluid flowing through the foraminous portion to the thermally conductive geometrically shaped plates. One or more restrictive orifices may be configured to form the at least part of the first portion of the external fluid traveling therethrough into a stream of fluid impinging against one or more of the thermally conductive geometrically shaped plates.

In an exemplary embodiment, the heat exchange system or the heat exchanger may further include thermally conductive cascading sheets configured to form a cascade of impinging jets to transfer heat to at least part of the first portion of the external fluid flowing through the foraminous portion to the thermally conductive cascading sheets.

In an exemplary embodiment, the foraminous portion may form at least part of a leading edge of a vehicle and/or a downstream surface of a vehicle.

In an exemplary embodiment, the foraminous portion may form at least part of a leading edge of an aircraft and/or a corresponding downstream surface of an aircraft.

In an exemplary embodiment, the foraminous portion may form at least part of a leading edge of a tail of an aircraft, a wing of an aircraft, and/or a nacelle of an aircraft.

In an exemplary embodiment, the foraminous portion may include a microporous portion, a plurality of laser drilled holes, and/or a porous portion.

In an exemplary embodiment, the heat exchange system or the heat exchanger may further include a second heat exchanger having one or more fluid conduits configured to receive fluid from a closed fluid system of the heat exchanger to transfer heat to the foraminous portion.

In an exemplary embodiment, the heat exchange system or the heat exchanger may further include a second heat exchanger configured to receive air through a second laminar flow control surface having a foraminous portion of a second vehicle panel forming the outer surface of the vehicle, the foraminous portion being configured to permit fluid flow therethrough and to provide laminar flow characteristics to external fluid that flows over the second laminar flow control surface, the second heat exchanger being configured to receive fluid from a closed fluid system of the heat exchange system to transfer heat to the fluid permitted to flow through the foraminous portion.

In an exemplary embodiment, the heat exchanger may be a first heat exchanger, and may further include a second heat exchanger configured to receive a cooling fluid, a controller configured to selectively direct the cooling fluid to the first heat exchanger to increase a rate of heat transfer from the first heat exchanger, and the controller being configured to selectively direct fluid flowing through the foraminous portion to the second heat exchanger to increase a rate of heat transfer from the second heat exchanger.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A heat exchange system for a vehicle, comprising:
    a vehicle panel for forming an outer surface of the vehicle;
    a laminar flow control surface forming at least a portion of an exterior surface of the vehicle panel, at least a portion of the laminar flow control surface being foraminous to permit a first portion of an external fluid to flow therethrough and to enhance laminar flow characteristics of a second portion of the external fluid that flows over the exterior surface of the vehicle panel;
    a heat exchanger in fluid communication with the foraminous portion to receive the first portion of the external fluid that flows interiorly through the foraminous portion and to provide heat transfer from the heat exchanger to the first portion of the external fluid; and
    one or more restrictive orifices between the foraminous portion and a thermally conductive surface of the heat exchanger, the one or more restrictive orifices being configured to form the first portion of the externally flowing air traveling therethrough into a respective impinging stream of air against the thermally conductive surface to provide heat transfer from the heat exchanger to the first portion of the externally flowing air via the thermally conductive surface.

2. The heat exchange system of claim 1, wherein the number and size of the restrictive orifices is based on a desired mass flow rate of the first portion of the external fluid, based on the amount of heat transfer from the heat exchanger to the first portion of the external fluid, and/or based on the Reynolds number of the second portion of the external fluid flowing over the exterior surface.

3. The heat exchange system of claim 1, wherein each restrictive orifice is a distance from a thermally conductive surface of the heat exchanger based on a mass flow rate of the first portion of the external fluid flowing through each orifice and/or based on a size of each orifice.

4. The heat exchange system of claim 1, wherein the heat exchanger includes one or more thermally conductive fluid conduits configured to transfer heat from a heat source to at least part of the first portion of the external fluid flow through the foraminous portion, the thermally conductive fluid conduits being configured to carry a second fluid to transfer heat to the at least part of the first portion of the external fluid flowing through the foraminous portion.

5. The heat exchange system of claim 1, further comprising:
    one or more heat sources thermally connected to the heat exchanger.

6. The heat exchange system of claim 1, further comprising:
    one or more thermally conductive dividers extending from a portion of the heat exchanger to the foraminous portion of the laminar flow control surface to guide at least part of the first portion of the external fluid, and/or to control spatial mass flow distribution, of the first portion of the external fluid, along the foraminous portion of the surface.

7. The heat exchange system of claim 1, further comprising:
    one or more de-icing conduits for transferring heat from the heat exchanger to the foraminous portion or for transferring a second fluid from the heat exchanger to the exterior surface.

8. The heat exchange system of claim 1, wherein the heat exchanger includes a thermally conductive structural support that is configured to resist changing of a shape of the exterior surface of the vehicle panel or another vehicle component, wherein the structural support is configured to receive at least part of the first portion of the external fluid that has flowed through the foraminous portion to provide heat transfer from the conductive structural support to at least part of the first portion of the external fluid.

9. The heat exchange system of claim 1, further comprising:
    one or more exhaust channels configured to exhaust at least part of the first portion of the external fluid that has flowed through the foraminous portion and absorbed heat from the thermally conductive device, wherein at least one of the exhaust channels flows to a cabin of the vehicle to adjust a temperature within the cabin, and/or at least one of the exhaust channels flows to a downstream end of an aircraft engine nacelle's bypass nozzle.

10. The heat exchange system of claim 1, wherein the heat exchanger further includes a plurality of thermally conductive parallel plates thermally connected to the thermally conductive surface, the thermally conductive parallel plates being configured to transfer heat to at least part of the first portion of the external fluid flowing through the foraminous portion to the thermally conductive parallel plates.

11. The heat exchange system of claim 1, wherein the heat exchanger further includes a plurality of thermally conductive geometrically shaped plates that form at least a portion of the thermally conductive surface and that are configured to transfer heat to at least part of the first portion of the external fluid flowing through the foraminous portion to the thermally conductive geometrically shaped plates; and wherein the one or more restrictive orifices is configured to form at least part of the first portion of the external fluid traveling therethrough into a stream of fluid impinging against one or more of the thermally conductive geometrically shaped plates.

12. The heat exchange system of claim 1, wherein the heat exchanger further includes thermally conductive cascading sheets configured to form a cascade of impinging jets to transfer heat to at least part of the first portion of the external fluid flowing through the foraminous portion to the thermally conductive cascading sheets.

13. The heat exchange system of claim 1, wherein the heat exchanger is a first heat exchanger, and further comprising:

a second heat exchanger configured to receive air through a second laminar flow control surface having a foraminous portion of a second vehicle panel forming the outer surface of the vehicle, the foraminous portion being configured to permit fluid flow therethrough and to provide laminar flow characteristics to external fluid that flows over the second laminar flow control surface;

the second heat exchanger being configured to receive fluid from a closed fluid system of the heat exchange system to transfer heat to the fluid permitted to flow through the foraminous portion.

14. The heat exchange system of claim 1, wherein the heat exchanger is a first heat exchanger, and further comprising:

a second heat exchanger configured to receive a cooling fluid;

a controller configured to selectively direct the cooling fluid to the first heat exchanger to increase a rate of heat transfer from the first heat exchanger, and the controller being configured to selectively direct fluid flowing through the foraminous portion to the second heat exchanger to increase a rate of heat transfer from the second heat exchanger.

15. A method of reducing drag of a vehicle and removing heat from the vehicle with the heat exchange system of claim 1, comprising:

receiving air flowing through the foraminous portion;
transferring heat from a heat source to the heat exchanger; and
directing the air flowing through the foraminous portion and through the one or more restrictive orifices into a respective impinging stream against the thermally conductive surface of the heat exchanger to transfer heat from the heat exchanger to the air flowing through the foraminous portion and the one or more restrictive orifices.

16. An aircraft, comprising:
the heat exchange system of claim 1, wherein the panel is for forming an outer surface of the aircraft.

17. A wing of an aircraft, a tail of an aircraft, a nacelle of an aircraft or another part, of an aircraft, impinged by air during flight, comprising:
the heat exchange system of claim 1, wherein the panel is for forming an outer surface of the respective wing, tail, nacelle or the another part of the aircraft that is impinged by air during flight.

18. A heat exchange system for a vehicle, comprising:
a vehicle panel for forming an outer surface of the vehicle;
a laminar flow control surface forming at least a portion of an exterior surface of the vehicle panel, at least a portion of the laminar flow control surface being foraminous to permit a first portion of an external fluid to flow therethrough and to enhance laminar flow characteristics of a second portion of the external fluid that flows over the exterior surface of the vehicle panel;
a heat exchanger in fluid communication with the foraminous portion to receive the first portion of the external fluid that flows interiorly through the foraminous portion and to provide heat transfer from the heat exchanger to the first portion of the external fluid; and
one or more thermally conductive dividers extending from a portion of the heat exchanger to the foraminous portion of the laminar flow control surface to guide at least part of the first portion of the external fluid, and/or to control spatial mass flow distribution, of the first portion of the external fluid, along the foraminous portion of the surface.

19. A heat exchange system for a vehicle, comprising:
a vehicle panel for forming an outer surface of the vehicle;
a laminar flow control surface forming at least a portion of an exterior surface of the vehicle panel, at least a portion of the laminar flow control surface being foraminous to permit a first portion of an external fluid to flow therethrough and to enhance laminar flow characteristics of a second portion of the external fluid that flows over the exterior surface of the vehicle panel; and
a heat exchanger in fluid communication with the foraminous portion to receive the first portion of the external fluid that flows interiorly through the foraminous portion and to provide heat transfer from the heat exchanger to the first portion of the external fluid;
wherein the heat exchanger includes a thermally conductive structural support that is configured to resist changing of a shape of the exterior surface of the vehicle panel or another vehicle component, wherein the structural support is configured to receive at least part of the first portion of the external fluid that has flowed through the foraminous portion to provide heat transfer from the conductive structural support to at least part of the first portion of the external fluid.

20. The heat exchange system of claim 19, wherein the thermally conductive structural support includes one or more of a spar of an aircraft, a rib of the aircraft, and/or a stringer of the aircraft.

* * * * *